US008095847B2

(12) United States Patent
Carlson et al.

(10) Patent No.: US 8,095,847 B2
(45) Date of Patent: Jan. 10, 2012

(54) EXCEPTION CONDITION HANDLING AT A CHANNEL SUBSYSTEM IN AN I/O PROCESSING SYSTEM

(75) Inventors: Scott M. Carlson, Tucson, AZ (US); Daniel F. Casper, Poughkeepsie, NY (US); John R. Flanagan, Poughkeepsie, NY (US); Charles W. Gainey, Poughkeepsie, NY (US); Roger G. Hathorn, Tucson, AZ (US); Catherine C. Huang, Poughkeepsie, NY (US); Matthew J. Kalos, Tucson, AZ (US); Ugochukwu Charles Njoku, Yonkers, NY (US); Louis C. Ricci, Hyde Park, NY (US); Gustav E. Sittmann, Webster Groves, MO (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 12/030,925

(22) Filed: Feb. 14, 2008

(65) Prior Publication Data

US 2009/0210768 A1    Aug. 20, 2009

(51) Int. Cl.
*H03M 13/00* (2006.01)
*G06F 11/00* (2006.01)
(52) U.S. Cl. .......................................... 714/758; 714/56
(58) Field of Classification Search ................ 714/6, 56, 714/746, 758; 710/36, 48
See application file for complete search history.

(56) References Cited

U.S. PATENT DOCUMENTS

| | | |
|---|---|---|
| 3,943,283 A | 3/1976 | Caragliano et al. |
| 4,004,277 A | 1/1977 | Gavril |
| 4,374,415 A | 2/1983 | Cormier et al. |
| 4,380,046 A | 4/1983 | Frosch et al. |
| 4,455,605 A | 6/1984 | Cormier et al. |
| 4,760,518 A | 7/1988 | Potash et al. |
| 4,779,188 A | 10/1988 | Gum et al. |
| 4,837,677 A | 6/1989 | Burrus, Jr. et al. |
| 4,866,609 A | 9/1989 | Calta et al. |
| 4,870,566 A | 9/1989 | Cooper et al. |

(Continued)

FOREIGN PATENT DOCUMENTS

DE    3931514    3/1990

(Continued)

OTHER PUBLICATIONS

Aboda, B.-et al.; Network Working Group; "Securing Block Storage Protocols Over IP"; ACM Digital Library; RFC3723; Apr. 2004.

(Continued)

*Primary Examiner* — Shelly A Chase
(74) *Attorney, Agent, or Firm* — Cantor Colburn LLP; John Campbell

(57) ABSTRACT

A computer program product, apparatus, and method for handling exception condition feedback at a channel subsystem of an I/O processing system using data from a control unit are provided. The computer program product includes a tangible storage medium readable by a processing circuit and storing instructions for execution by the processing circuit for performing a method. The method includes sending a command message to the control unit, and receiving a response message in response to the command message. The response message includes exception condition feedback identifying a termination reason code in response to unsuccessful execution of at least one command in the command message. The method also includes interrupting a CPU in the I/O processing system, and reporting status associated with the exception condition feedback to the CPU in an interrupt response block.

31 Claims, 13 Drawing Sheets

U.S. PATENT DOCUMENTS

| | | |
|---|---|---|
| 5,016,160 A | 5/1991 | Lambeth et al. |
| 5,031,091 A | 7/1991 | Wakatsuki et al. |
| 5,040,108 A | 8/1991 | Kanazawa |
| 5,386,512 A | 1/1995 | Crisman et al. |
| 5,388,219 A | 2/1995 | Chan et al. |
| 5,410,727 A | 4/1995 | Jaffe et al. |
| 5,434,980 A | 7/1995 | Casper et al. |
| 5,461,721 A | 10/1995 | Cormier et al. |
| 5,500,942 A | 3/1996 | Eickemeyer et al. |
| 5,526,484 A | 6/1996 | Casper et al. |
| 5,528,755 A * | 6/1996 | Beardsley et al. ............ 714/48 |
| 5,539,918 A | 7/1996 | Allen et al. |
| 5,546,533 A | 8/1996 | Koyama |
| 5,561,809 A | 10/1996 | Elko et al. |
| 5,584,039 A | 12/1996 | Johnson et al. |
| 5,600,793 A | 2/1997 | Nord |
| 5,613,163 A | 3/1997 | Marron et al. |
| 5,640,600 A | 6/1997 | Satoh et al. |
| 5,758,190 A | 5/1998 | Johnson et al. |
| 5,768,620 A | 6/1998 | Johnson et al. |
| 5,831,985 A | 11/1998 | Sandorfi |
| 5,860,022 A | 1/1999 | Kondou et al. |
| 5,894,583 A | 4/1999 | Johnson et al. |
| 5,918,028 A | 6/1999 | Silverthorn et al. |
| 6,125,399 A * | 9/2000 | Hamilton ............... 709/245 |
| 6,230,218 B1 | 5/2001 | Casper et al. |
| 6,343,335 B1 | 1/2002 | Dahman et al. |
| 6,484,217 B1 | 11/2002 | Fuente et al. |
| 6,546,435 B1 | 4/2003 | Yoshimura et al. |
| 6,584,511 B1 | 6/2003 | Marsh, III et al. |
| 6,609,161 B1 | 8/2003 | Young |
| 6,647,016 B1 | 11/2003 | Isoda et al. |
| 6,693,880 B2 | 2/2004 | Gregg et al. |
| 6,694,390 B1 | 2/2004 | Bogin et al. |
| 6,751,680 B2 | 6/2004 | Langerman et al. |
| 6,772,207 B1 | 8/2004 | Dorn et al. |
| 6,826,661 B2 | 11/2004 | Umbehocker et al. |
| 6,839,773 B2 | 1/2005 | Vishlitzky et al. |
| 6,862,322 B1 | 3/2005 | Ewen et al. |
| 6,898,202 B2 | 5/2005 | Gallagher et al. |
| 6,915,378 B2 | 7/2005 | Roberti |
| 7,000,036 B2 | 2/2006 | Carlson et al. |
| 7,035,540 B2 | 4/2006 | Finan et al. |
| 7,058,735 B2 | 6/2006 | Spencer |
| 7,111,130 B2 | 9/2006 | Blake et al. |
| 7,120,728 B2 | 10/2006 | Krakirian et al. |
| 7,124,207 B1 | 10/2006 | Lee et al. |
| 7,133,988 B2 | 11/2006 | Fujibayashi |
| 7,149,823 B2 | 12/2006 | Miller et al. |
| 7,164,425 B2 | 1/2007 | Kwak et al. |
| 7,202,801 B2 | 4/2007 | Chou |
| 7,277,387 B2 | 10/2007 | Sanders et al. |
| 7,315,911 B2 | 1/2008 | Davies et al. |
| 7,382,733 B2 | 6/2008 | Banerjee et al. |
| 7,395,284 B2 | 7/2008 | Sato et al. |
| 7,398,335 B2 | 7/2008 | Sonksen et al. |
| 7,484,021 B2 | 1/2009 | Rastogi et al. |
| 7,500,030 B2 | 3/2009 | Hathorn et al. |
| 7,539,777 B1 | 5/2009 | Aitken |
| 7,543,087 B2 | 6/2009 | Philbrick et al. |
| 7,555,554 B2 | 6/2009 | Manders et al. |
| 7,558,827 B2 | 7/2009 | Kawashima et al. |
| 7,577,772 B2 | 8/2009 | Sonksen et al. |
| 7,577,773 B1 | 8/2009 | Gandhi et al. |
| 7,594,057 B1 | 9/2009 | Gandhi et al. |
| 7,599,360 B2 | 10/2009 | Edsall et al. |
| 7,711,871 B1 | 5/2010 | Haechten et al. |
| 7,743,197 B2 | 6/2010 | Chavan et al. |
| 7,765,336 B2 | 7/2010 | Butler et al. |
| 7,826,349 B2 | 11/2010 | Kaur et al. |
| 7,840,717 B2 | 11/2010 | Flanagan et al. |
| 7,840,718 B2 | 11/2010 | Ricci et al. |
| 7,840,719 B2 | 11/2010 | Casper et al. |
| 7,856,511 B2 | 12/2010 | Ricci et al. |
| 2001/0030943 A1 | 10/2001 | Gregg et al. |
| 2002/0062407 A1 | 5/2002 | Tateyama et al. |
| 2002/0099967 A1 | 7/2002 | Kawaguchi |
| 2002/0152338 A1 | 10/2002 | Elliott et al. |
| 2003/0056000 A1 | 3/2003 | Mullendore et al. |
| 2003/0084213 A1 | 5/2003 | Brice, Jr. et al. |
| 2003/0158998 A1 | 8/2003 | Smith |
| 2003/0188053 A1 | 10/2003 | Tsai |
| 2004/0030822 A1 | 2/2004 | Rajan et al. |
| 2004/0113772 A1 | 6/2004 | Hong Chou |
| 2004/0136241 A1 | 7/2004 | Rapp et al. |
| 2004/0151160 A1 | 8/2004 | Sanders et al. |
| 2004/0193968 A1 | 9/2004 | Dugan et al. |
| 2004/0260851 A1 | 12/2004 | Tu |
| 2005/0018673 A1 | 1/2005 | Dropps et al. |
| 2005/0102456 A1 | 5/2005 | Kang |
| 2005/0105456 A1 | 5/2005 | Cookson et al. |
| 2005/0108251 A1 | 5/2005 | Hunt |
| 2005/0175341 A1 | 8/2005 | Ovadia |
| 2005/0204069 A1 | 9/2005 | Carlson et al. |
| 2006/0050726 A1 | 3/2006 | Ahmed et al. |
| 2006/0085595 A1 | 4/2006 | Slater |
| 2006/0159112 A1 | 7/2006 | Sundaram et al. |
| 2006/0224795 A1 | 10/2006 | Muto et al. |
| 2007/0005838 A1 | 1/2007 | Chang et al. |
| 2007/0016554 A1 | 1/2007 | Dapp et al. |
| 2007/0061463 A1 | 3/2007 | Hiramatsu et al. |
| 2007/0072543 A1 | 3/2007 | Paila et al. |
| 2007/0091497 A1 | 4/2007 | Mizuno et al. |
| 2007/0162631 A1 | 7/2007 | Balakrishnan et al. |
| 2007/0174544 A1 | 7/2007 | Yasuda et al. |
| 2007/0239944 A1 | 10/2007 | Rupanagunta et al. |
| 2007/0294697 A1 | 12/2007 | Theimer et al. |
| 2008/0040519 A1 | 2/2008 | Starr et al. |
| 2008/0059638 A1 | 3/2008 | Hathorn et al. |
| 2008/0147889 A1 | 6/2008 | Casper et al. |
| 2008/0147890 A1 | 6/2008 | Casper et al. |
| 2008/0235553 A1 | 9/2008 | Chintada |
| 2008/0256264 A1 | 10/2008 | Muto et al. |
| 2008/0273518 A1 | 11/2008 | Pratt |
| 2008/0307122 A1 | 12/2008 | Butler et al. |
| 2009/0144586 A1 | 6/2009 | Casper et al. |
| 2009/0172203 A1 | 7/2009 | Casper et al. |
| 2009/0210557 A1 | 8/2009 | Gainey, Jr. et al. |
| 2009/0210559 A1 | 8/2009 | Flanagan et al. |
| 2009/0210560 A1 | 8/2009 | Yudenfriend et al. |
| 2009/0210561 A1 | 8/2009 | Ricci et al. |
| 2009/0210562 A1 | 8/2009 | Huang et al. |
| 2009/0210563 A1 | 8/2009 | Flanagan et al. |
| 2009/0210564 A1 | 8/2009 | Ricci et al. |
| 2009/0210570 A1 | 8/2009 | Bendyk et al. |
| 2009/0210571 A1 | 8/2009 | Casper et al. |
| 2009/0210572 A1 | 8/2009 | Yudenfriend et al. |
| 2009/0210573 A1 | 8/2009 | Yudenfriend et al. |
| 2009/0210576 A1 | 8/2009 | Casper et al. |
| 2009/0210579 A1 | 8/2009 | Bendyk et al. |
| 2009/0210580 A1 | 8/2009 | Bendyk et al. |
| 2009/0210581 A1 | 8/2009 | Flanagan et al. |
| 2009/0210582 A1 | 8/2009 | Bendyk et al. |
| 2009/0210583 A1 | 8/2009 | Bendyk et al. |
| 2009/0210584 A1 | 8/2009 | Carlson et al. |
| 2009/0210585 A1 | 8/2009 | Ricci et al. |
| 2009/0210769 A1 | 8/2009 | Casper et al. |
| 2009/0210884 A1 | 8/2009 | Ricci et al. |
| 2009/0307388 A1 | 12/2009 | Tchapda |
| 2010/0014526 A1 | 1/2010 | Chavan et al. |
| 2010/0064072 A1 | 3/2010 | Tang et al. |

FOREIGN PATENT DOCUMENTS

| | | |
|---|---|---|
| GB | 1264096 | 2/1972 |
| GB | 2291990 | 2/1996 |
| JP | 63236152 | 10/1988 |
| JP | 2010-140127 A | 6/2010 |
| WO | WO2006102664 A2 | 9/2006 |

OTHER PUBLICATIONS

Azimi, R.-et al.; "miNI: Reducing Network Interface Memory Requirements with Dynamic Handle Lookup"; ACM Digital Library; pp. 261-272; Jun. 2003.

Emulex Corporation; "Install the LP850 Host Adapter"; Google/ Emulex Corporation, LightPulse LP850 Fibre Channel PCI Host Adapter Manuals; pp. 1-10, 1999.

Foong, A.-et al.; "Towards SSD-Ready Enterprise Platforms"; Google/Intel Corporation; 2008-2009.
Hewlett-Packard Company; HP A4800A PCI FWD SCSI Host Bus Adapter—Service & User Guide, Edition 6; Google/H-P; 2001.
Hewlett-Packard Company; "HP A5149 PCI Ultra2 SCSI Host Bus Adapter—Service and User Guide", Edition 2; Google/H-P; 2001.
POU920070301US1, U.S. Appl. No. 12/030,951, Notice of Allowance Mailed Apr. 4, 2011.
POU920060228US2, U.S. Appl. No. 12/364,615, Notice of Allowance Mailed Mar. 10, 2011.
Jiang, J.-et al.; "The Role of FCoE in I/O Consolidation"; ACM Digital Library/International Conf on Advanced Infocomm Technology '08; Jul. 2008.
Josephson, WK.-et al.; "DFS: A File System for Virtualized Flash Storage"; ACM Digital Library; vol. 6, No. 3, Article 14, Sep. 2010.
LSI Corporation; "PCI Express to 6Gb/s SAS Host Bus Adapters"; Google; Chapter 1, Introduction/Overview; LSI User Guide; Oct. 2009.
LSI; "ScsiPortGetDeivceBase"; Google/LSI; Apr. 2003.
Magoutis, K.; "The Optimistic Direct Access File System: Design and Network Interface Support"; Division of Engineering & Applied Science, Harvard Univ.; Feb. 2002.
Miller, DJ.-et al.; "Motivating Future Interconnects: A Differential Measurement Analysis of PCI Latency"; ACM Digital Library; pp. 94-105; Oct. 2009.
Network Storage Systems; Google; Oct. 2007.
Sun, Oracle; "Sun Storage 6 Gb SAS PCIe HBA, External—Installation Guide for HBA Models"; Google; Revision A; Nov. 2010.
Petersen, MK.-et al.; "DIF/DIX Aware Linux SCSI HBA Interface"; Google; Oracle Linux Engineering; Jul. 2008.
Satran, J.-et al.; Network Working Group; "Internet Small Computer Systems Interface (iSCSI)"; ACM Digital Library; RFC3720; Apr. 2004.
Vaghani, SB.; "Virtual Machine File System"; VMWare Inc./ACM Digital Library; pp. 57-69; 2008-2009.
U.S. Appl. No. 12/031,201 Final Office Action dated Jun. 13, 2011.
U.S. Appl. No. 12/946,514, Non-Final Office Action Mailed Jun. 23, 2011.
U.S. Appl. No. 12/183,323, Notice of Allowance Mailed Jun. 23, 2011.
Written Opinion and International Search Report for PCT/EP2009/051445 dated Jun. 25, 2009.
Written Opinion and International Search Report for PCT/EP2009/051446 dated Jun. 25, 2009.
Written Opinion and International Search Report for PCT/EP2009/051462 dated Jul. 1, 2009.
Written Opinion and International Search Report for PCT/EP2009/051450 dated Jul. 7, 2009.
Written Opinion and International Search Report for PCT/EP2009/051459 dated Jun. 23, 2009.
Written Opinion and International Search Report for PCT/EP2009/051463 dated Jul. 22, 2009.
U.S. Appl. No. 12/030,939 Notice of Alllowance mailed Jun. 29, 2010.
U.S. Appl. No. 12/030,954 Non Final Office Action mailed Jul. 12, 2010.
U.S. Appl. No. 12/030,961 Final Office Action mailed Jul. 12, 2010.
U.S. Appl. No. 12/030,993 Non Final Office Action mailed Jun. 28, 2010.
U.S. Appl. No. 12/031,021 Notice of Allowance mailed Jul. 8, 2010.
U.S. Appl. No. 12/031,023 Non Final Office Action mailed Jun. 11, 2010.
U.S. Appl. No. 12/183,323 Non Final Office Action mailed Jul. 19, 2010.
U.S. Appl. No. 12/392,246 Notice of Allowance mailed Jul. 15, 2010.
Brice, et al.; U.S. Appl. No. 11/464,613; "Flexibility Controlling the Transfer of Data Between Input/Output Devices and Memory"; Filed Aug. 15, 2006; Specification having 23 pages and Drawings having 4 sheets.
Casper, et al.; U.S. Appl. No. 11/548,060; "Facilitating Input/Output Processing by Using Transport Control Words to Reduce Input/Output Communications"; Filed Oct. 16, 2006; Specification having 32 pages and Drawing having 12 sheets.
Casper, et al.; U.S. Appl. No. 11/548,093; "Facilitating Access to Status and Measurement Data Associated With Input/Output Processing"; Filed Oct. 16, 2006; Specification having 33 pages. and Drawings having 12 sheets.
Dauby, et al. "Contention Resolution Between Two Processors"; IBM Technical Disclosure Bulletin; vol. 26; No. 10A; Mar. 1984; 3 pages.
DeVeer, J.A.; "Control Frame Multiplexing on Serial I/O Channels"; IBM Technical Disclosure Bulletin; vol. 32; No. 10A; Mar. 1990; pp. 39-40.
Golasky, Richard; "Link-Level Error Recovery With Tape Backup"; Dell Power Solutions; Aug. 2005; pp. 88-91.
"IBM® z/Architecture Principles of Operation", Publication No. SA22-7832-05, 6th Edition, Apr. 2007. 1,215 pages separated into 4 electronic attachments.
Peterson, David; "Information Technology, Fibre Channel Protocol for SCSI, Fourth Version (FCP-3)", Draft Proposed American National Standard, Jun. 2004; pp. 1-142.
Snively, et al.; "Fibre Channel Single Byte Command Code Sets—3 Mapping Protocol (FC-SB-3)"; T11/Project 1357-D/Rev. 1.6, INCITS; Mar. 2003; pp. 1-206.
Snively, et al.; "Fibre Channel, Framing and Signaling"; (FC-FS) Rev. 1.70; NCITS Working Draft Proposed American National Standard for Information Technology; Feb. 2002; pp. i-575.
U.S. Appl. No. 12/030,912 Non-Final Office Action dated Mar. 18, 2010.
U.S. Appl. No. 12/030,920 Non-Final Office Action dated Feb. 23, 2010.
U.S. Appl. No. 12/030,954 Non-Final Office Action dated Jan. 21, 2010.
Written Opinion and International Search Report for PCT/EP2009/051461 dated Sep. 22, 2009.
U.S. Appl. No. 12/031,182 Non-Final Office Action dated Jan. 22, 2010.
U.S. Appl. No. 12/031,201 Non-Final Office Action dated Jan. 25, 2010.
International Search Report; International Application No. PCT/EP2009/059184; International Filing Date: Jul. 16, 2009; Date of mailing: Jan. 14, 2010; 9 pages.
"Information Technology—Fibre Channel Protocol for SCSI, Third Version (FCP-3)," T10 Project 1560-D, Revision 4g, Sep. 13, 2005.
U.S. Appl. No. 12/031,038 Non-Final Office Action dated Nov. 16, 2009.
U.S. Appl. No. 12/030,975 Non-Final Office Action dated Oct. 22, 2009.
U.S. Appl. No. 12/030,932 Non-Final Office Action dated Dec. 16, 2009.
U.S. Appl. No. 12/031,023 Non-Final Office Action dated Oct. 29, 2009.
U.S. Appl. No. 12/030,951 Non-Final Office Action dated Nov. 23, 2009.
U.S. Appl. No. 12/030,961 Non-Final Office Action dated Dec. 17, 2009.
U.S. Appl. No. 12/030,939 Non-Final Office Action dated Nov. 16, 2009.
U.S. Appl. No. 12/030,989 Non-Final Office Action dated Oct. 22, 2009.
U.S. Appl. No. 12/030,993 Non-Final Office Action dated Oct. 28, 2009.
U.S. Appl. No. 12/031,021 Non-Final Office Action dated Jan. 8, 2010.
U.S. Appl. No. 12/181,662—Non-Final Office Action dated Jun. 18, 2009.
U.S. Appl. No. 12/181,662—Final Office Action dated Jan. 4, 2010.
Iren, et al.; "The Transport Layer: Tutorial and Survey"; ACM Computing Surveys; vol. 31, No. 4; Dec. 1999; pp. 360-405.
International Search Report and Written Opinion for PCT/EP2009/051447 dated Jul. 1, 2009.
International Search Report and Written Opinion for PCT/EP2009/051483 dated Jul. 27, 2009.
Nordstrom.; "Sequence Reception Method for a Fibre Channel Protocol Chip"; IBM Technical Disclosure Bulletin; vol. 38, No. 12; Dec. 1995; pp. 267-269.

U.S. Appl. No. 11/548,060 Non-Final Office Action dated Apr. 15, 2008.
U.S. Appl. No. 11/548,093 Non-Final Office Action dated Apr. 17, 2008.
"Protocol for Insochronous Traffic Over Fiber Channel Switching"; IBM Technical Disclosure Bulletin; vol. 37, No. 06B; Jun. 1994. pp. 377-380.
Sachs, M.W.; "I/O Marker Changing"; IBM Technical Disclosure Bulletin; vol. 37, No. 02A; Feb. 1994; pp. 75-76.
Simmons et al.; "A Performance Comparison of Three Supercomputers: Fujitsu VP-2600, NEC SX-3, and CRAY Y-MP"; ACM, Conference on High Performance Networking and Computing, Proceedings of the 1991 ACM/IEEE conference on Supercomputing, Albuquerque, New Mexico; Jul. 1991; pp. 150-157.
Srikrishnan et al.; "Sharing FCP Adapters Through Virtualization"; IBM J. Res. & Dev., vol. 51, No. 1/2; Jan./Mar. 2007; pp. 103-118.
Stone, et al.; "When the CRC and TCP Checksum Disagree"; SIGCOMM '00, Stockholm, Sweden; Jul. 2000; 10 pages.
U.S. Appl. No. 12/183,315, filed Jul. 31, 2008.
U.S. Appl. No. 12/183,323, filed Jul. 31, 2008.
U.S. Appl. No. 12/183,305, filed Jul. 31, 2008.
"z/Architecture-Principles of Operation," IBM Publication No. SA22-7832-04, 5th Ed., Sep. 2005.
Behrs, Jr, "Adaptive Prediction Minimizes Data Overrun and Underrun", IBM, Nov. 1994, pp. 1-3. http://priorartdatabase.com/IPCOM/000114189.
U.S. Appl. No. 12/031,038, Notice of Allowance Mailed Oct. 6, 2010.
Final Office Action for POU920070216US1 U.S. Appl. No. 12/030,912 mailed Oct. 6, 2010.
POU920070217US1_U.S. Appl. No. 12/031,182 Final Office Action Mailed Jul. 22, 2010.
U.S. Appl. No. 12/030,920 Notice of Allowance Mailed Aug. 23, 2010.
U.S. Appl. No. 12/030,932, Final Office Action Mailed Jul. 23, 2010.
U.S. Appl. No. 12/030,951, Final Office Action Mailed Oct. 26, 2010.
U.S. Appl. No. 12/030,961 Notice of Allowance Mailed Nov. 5, 2010.
U.S. Appl. No. 12/030,967 Notice of Allowance Mailed Oct. 7, 2010.
U.S. Appl. No. 12/031,201, Final Office Action Mailed Aug. 3, 2010.
U.S. Appl. No. 12/031,042, Final Office Action Mailed Oct. 25, 2010.
U.S. Appl. No. 12/181,662, Notice of Allowance Mailed Aug. 4, 2010.
U.S. Appl. No. 12/364,615, Non Final Office Action Mailed Oct. 7, 2010.
U.S. Appl. No. 12/183,305, Notice of Allowance Mailed Nov. 1, 2010.
IBM, "Method and Apparatus to Monitor PAV Utilization", Feb. 2005, pp. 1-3. http://priorartdatabase.com/IPCOM/000082878.
Moore et al., Reconfiguration of Storage Elements to Improve Performance, IBM, Dec. 1983, pp. 1-3. http://priorartdatabas.com/IPCOM/000047719.
U.S. Appl. No. 12/030,975, Notice of Allowance Mailed Oct. 19, 2010.
Cakmakci, Melih, et al. "Bi-Directional Communication amoung "Smart" Compoents in a Networked Control System", University of Michigan: Department of Mechanical Engineering, 2005 American control conference, Jun. 8-10, 2005, Portland, OR, pp. 627-632.
U.S. Appl. No. 12/031,182, Non Final Office Action Mailed Dec. 23, 2010.
U.S. Appl. No. 12/030,920, Notice of Allowance Mailed Dec. 28, 2010.
U.S. Appl. No. 12/030,954, Notice of Allowance mailed Dec. 28, 2010.
U.S. Appl. No. 12/030,932, Non-Final Office Action Mailed Dec. 16, 2010.
U.S. Appl. No. 12/031,023, Final Office Action Mailed Nov. 18, 2010.
U.S. Appl. No. 12/031,201, Non-Final Office Action Mailed Dec. 27, 2011.
U.S. Appl. No. 12/030,985, Notice of Allowance mailed Nov. 24, 2010.
U.S. Appl. No. 12/030,993, Final Office Action Mailed Dec. 10, 2010.
U.S. Appl. No. 12/183,315, Notice of Allowance Mailed Dec. 13, 2010.
U.S. Appl. No. 12/183,323, Non-Final Office Action Mailed Jan. 3, 2011.
Ishikawa, Hikaru, et al. "Bi-Directional OFDM Transmission using Adaptive Modulation that spreads Data Symbols". Power Line Communications and its Applications, 2006, IEEE International Symposium on, vol., No., pp. 202-207.
Tachikawa, T., et al. "ARQ protocols for bi-directional data transmission," Information Networking, 1998 (ICOIN-12) Proceedings., Twelfth International Conference on., vol., No., pp. 468-473, Jan. 21-23, 1998.

* cited by examiner

| DEFINITION | | WORD | BYTE 0 | 1 | 2 | 3 | |
|---|---|---|---|---|---|---|---|
| TRANSPORT COMMAND IU | HEADER 902 | 0 | | ADDRESS HEADER 912 | | | |
| | TCH 904 | 1 | | | | | |
| | TRANSPORT-COMMAND-AREA HEADER (TCAH) 906 | 2 | COMMAND REFERENCE NUMBER/TASK 914 | | | | |
| | | 3 | FORMAT 920 | CONTROL 922 | RESERVED 924 | L1 LENGTH 916 | R/W 918 |
| | | 4 | RESERVED 926 | | | L2 LENGTH 928 | |
| | | 5 | SERVICE ACTION CODE 930 | | RESERVED 932 | PRIORITY 934 | |
| | | 6 | RESERVED 936 | | | | |
| | TRANSPORT COMMAND AREA (TCA) 908 | DCW 1 & CONTROL DATA 940 | COMMAND 948 | FLAGS 950 | RESERVED 952 | CD COUNT 954 | |
| | | | DATA BYTE COUNT 956 | | | | |
| | | | CONTROL DATA 958 | | | | |
| | | DCW 2 942 | COMMAND 960 | FLAGS 962 | RESERVED 964 | CD COUNT 966 | |
| | | | DATA BYTE COUNT 968 | | | | |
| | | DCW 3 944 | COMMAND 970 | FLAGS 972 | RESERVED 974 | CD COUNT 976 | |
| | | | DATA BYTE COUNT 978 | | | | |
| | | DCW 4 946 | COMMAND 980 | FLAGS 982 | RESERVED 984 | CD COUNT 986 | |
| | | | DATA BYTE COUNT 988 | | | | |
| | TRANSPORT-COMMAND AREA TRAILER (TCAT) 910 | | LRC 990 | | | | |
| | | | TRANSPORT DATA BYTE COUNT 992 | | | | |

FIG. 9

| DEFINITION | WORD | BYTE 0 | 1 | 2 | 3 |
|---|---|---|---|---|---|
| STATUS 1002 | 00 | | ADDRESS HEADER 1006 | | |
| | 01 | | | | |
| | 02 | STATUS FLAGS 1 1008 | MAX CU EXCHANGE PARAMETER 1010 | RESPONSE FLAGS 1012 | RESPONSE CODE 1014 |
| | 03 | | | RESIDUAL COUNT 1016 | |
| | 04 | | | RESPONSE LENGTH 1018 | |
| | 05 | SPC-4 SENSE TYPE 1022 | STATUS FLAGS 2 1024 | RESERVED 1020 | |
| | 06 | | | STATUS FLAGS 3 1026 | DEVICE STATUS 1028 |
| | 07 | | | LRC ON WORDS 0 TO 6 ABOVE 1030 | |
| TSH 1032 | 08 | ES LENGTH 1040 | ES FLAGS 1042 | | DCW OFFSET 1044 |
| | 09 | | | | 1046 |
| | 10 | | | DCW RESIDUAL COUNT | 1048 |
| | 11 | | | RESERVED | TERMINATION REASON CODES 1052 |
| TSA 1034 | 12 | 0 | | | |
| | 13 | 1 | | REASON CODE QUALIFIER (RCQ) WORDS 0 TO 3 1054 | |
| | 14 | 2 | | RESERVED 1050 | |
| | 15 | 3 | | | |
| | 15 + N | N | | UP TO 8 WORDS OF APPENDED DEVICE SENSE DATA 1056 | |
| LRC | 15 + N +1 | | | LRC ON WORD 08 to 15 + N | |

FIG. 10

EXCEPTION CONDITION HANDLING AT A CHANNEL SUBSYSTEM IN AN I/O PROCESSING SYSTEM

BACKGROUND OF THE INVENTION

1. Field of the Invention

The present disclosure relates generally to input/output processing, and in particular, to handling of exception condition feedback at a channel subsystem from a control unit in an input/output processing system.

2. Description of Background

Input/output (I/O) operations are used to transfer data between memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

The channel subsystem may employ channel command words (CCWs) to transfer data between the I/O devices and memory. A CCW specifies the command to be executed. For commands initiating certain I/O operations, the CCW designates the memory area associated with the operation, the action to be taken whenever a transfer to or from the area is completed, and other options.

Dining I/O processing, a list of CCWs is fetched from memory by a channel. The channel parses each command from the list of CCWs and forwards a number of the commands, each command in its own entity, to a control unit coupled to the channel. The control unit then processes the commands. The channel tracks the state of each command and controls when the next set of commands are to be sent to the control unit for processing. The channel ensures that each command is sent to the control unit in its own entity. Further, the channel infers certain information associated with processing the response from the control unit for each command.

Performing I/O processing on a per CCW basis may involve a large amount of processing overhead for the channel subsystem, as the channels parse CCWs, track state information, and react to responses from the control units. Therefore, it may be beneficial to shift much of the processing burden associated with interpreting and managing CCW and state information from the channel subsystem to the control units. Simplifying the role of channels in communicating between the control units and an operating system in the I/O processing system may increase communication throughput as less handshaking is performed. However, altering command sequences, as well as roles of the channel subsystem and the control units, can cause difficulties in detecting and reporting exception conditions associated with the I/O processing. When multiple commands are passed through the channel subsystem to the control units, the burden of detecting exception conditions, such as errors in the commands is placed on the control units. The control units must then provide feedback of any exception conditions to the channel subsystem to trigger exception handling for mitigating exception conditions. Accordingly, there is a need in the art for handling of exception condition feedback at a channel subsystem from a control unit in an input/output processing system.

BRIEF SUMMARY OF THE INVENTION

Embodiments of the invention include a computer program product for handling exception condition feedback at a channel subsystem of an I/O processing system using data from a control unit. The computer program product includes a tangible storage medium readable by a processing circuit and storing instructions for execution by the processing circuit for performing a method. The method includes sending a command message to the control unit, and receiving a response message in response to the command message. The response message includes exception condition feedback identifying a termination reason code in response to unsuccessful execution of at least one command in the command message. The method also includes interrupting a central processing unit (CPU) in the I/O processing system, and reporting status associated with the exception condition feedback to the CPU in an interrupt response block.

Additional embodiments include an apparatus for handling exception condition feedback in an I/O processing system. The apparatus includes a channel subsystem in communication with a control unit. The channel subsystem performs a method that includes sending a command message to the control unit, and receiving a response message in response to the command message. The response message includes exception condition feedback identifying a termination reason code in response to unsuccessful execution of at least one command in the command message. The method performed by the channel subsystem also includes interrupting a CPU in the I/O processing system, and reporting status associated with the exception condition feedback to the CPU in an interrupt response block.

Further embodiments include a method for handling exception condition feedback at a channel subsystem of an I/O processing system using data from a control unit. The method includes sending a command message to the control unit, and receiving a response message in response to the command message. The response message includes exception condition feedback identifying a termination reason code in response to unsuccessful execution of at least one command in the command message. The method also includes interrupting a CPU in the I/O processing system, and reporting status associated with the exception condition feedback to the CPU in an interrupt response block.

Other computer program products, apparatuses, and/or methods according to embodiments will be or become apparent to one with skill in the art upon review of the following drawings and detailed description. It is intended that all such additional computer program products, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 9 depicts one embodiment of a command message communicated from a channel subsystem to a control unit, in accordance with an aspect of the present invention;

FIG. 10 depicts one embodiment of a response message communicated from a control unit to a channel subsystem, in accordance with an aspect of the present invention;

Figure 1:
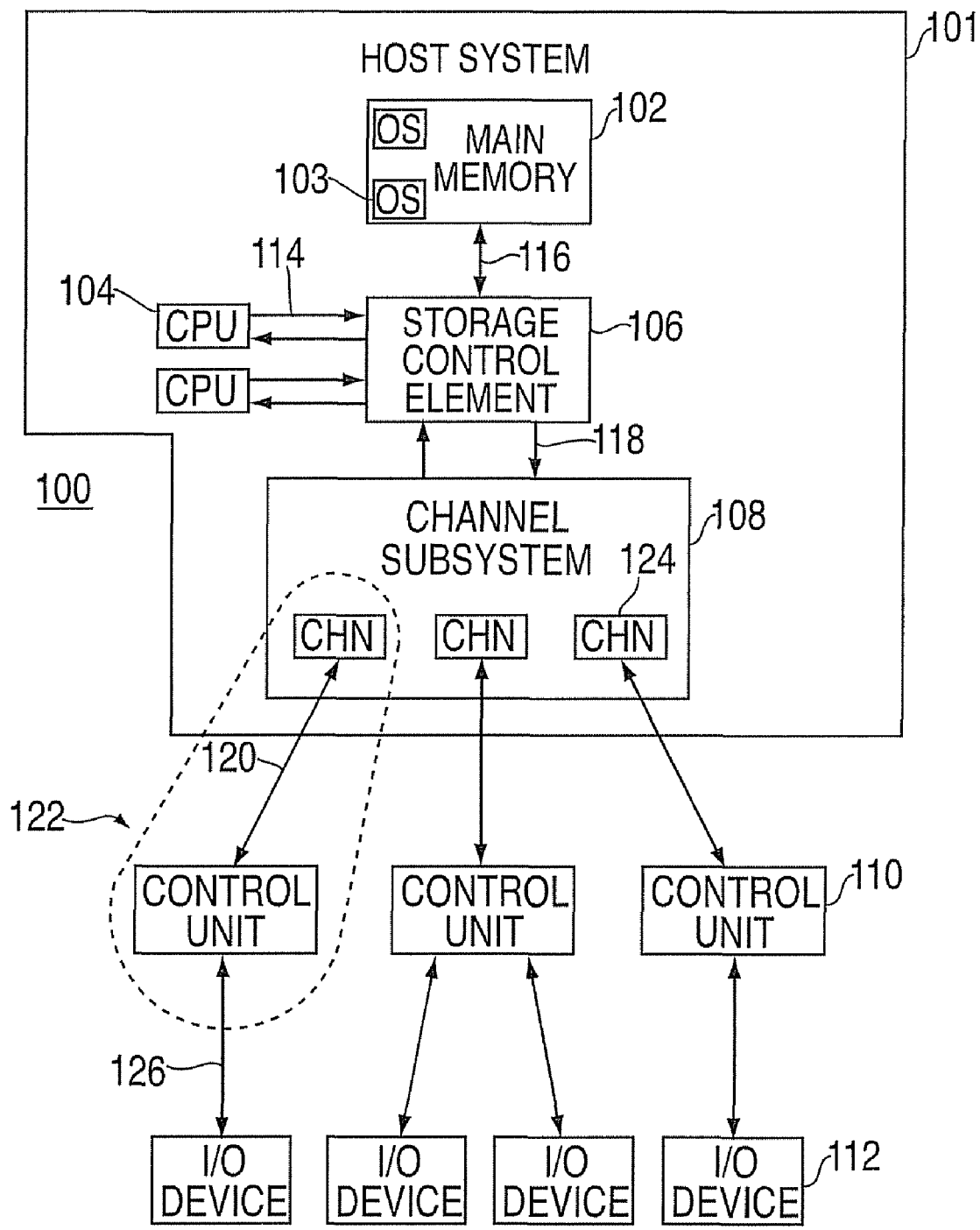
FIG. 1 depicts one embodiment of an I/O processing system incorporating and using one or more aspects of the present invention.

The detailed description explains the preferred embodiments of the invention, together with advantages and features, by way of example with reference to the drawings.

DETAILED DESCRIPTION OF THE INVENTION

In accordance with an aspect of the present invention, input/output (I/O) processing is facilitated. For instance, I/O processing is facilitated by readily enabling access to information, such as status and measurement data, associated with I/O processing. Further, I/O processing is facilitated, in one example, by reducing communications between components of an I/O processing system used to perform the I/O processing. For instance, the number of exchanges and sequences between an I/O communications adapter, such as a channel, and a control unit is reduced. This is accomplished by sending a plurality of commands from the I/O communications adapter to the control unit as a single entity for execution by the control unit, and by the control unit sending the data resulting from the commands, if any, as a single entity.

The plurality of commands are included in a block, referred to herein as a transport command control block (TCCB), an address of which is specified in a transport control word (TCW). The TCW is sent from an operating system or other application to the I/O communications adapter, which in turn forwards the TCCB in a command message to the control unit for processing. The control unit processes each of the commands absent a tracking of status relative to those individual commands by the I/O communications adapter. The plurality of commands is also referred to as a channel program, which is parsed and executed on the control unit rather than the I/O communications adapter.

In an exemplary embodiment, the control unit generates a response message including status and extended status information in response to executing the channel program. The control unit may also generate a response message without executing the channel program when an exception condition is detected, such as an error in the channel program that prevents execution. The control unit may include a number of elements to support communication between the I/O communications adapter and I/O devices, as well as in support of channel program execution. For example, the control unit can include control logic to parse and process messages, in addition to one or more queues, timers, and registers to facilitate communication and status monitoring. The I/O communications adapter parses the response message, extracting the status and extended status information, and provides feedback to processing elements of the I/O processing system.

One example of an I/O processing system incorporating and using one or more aspects of the present invention is described with reference to FIG. 1. I/O processing system 100 includes a host system 101, which further includes for instance, a main memory 102, one or more central processing units (CPUs) 104, a storage control element 106, and a channel subsystem 108. The host system 101 may be a large scale computing system, such as a mainframe or server. The I/O processing system 100 also includes one or more control units 110 and one or more I/O devices 112, each of which is described below.

Main memory 102 stores data and programs, which can be input from I/O devices 112. For example, the main memory 102 may include one or more operating systems (OSs) 103 that are executed by one or more of the CPUs 104. For example, one CPU 104 can execute a Linux® operating system 103 and a z/OS® operating system 103 as different virtual machine instances. The main memory 102 is directly addressable and provides for high-speed processing of data by the CPUs 104 and the channel subsystem 108.

CPU 104 is the controlling center of the I/O processing system 100. It contains sequencing and processing facilities for instruction execution, interruption action, timing functions, initial program loading, and other machine-related functions. CPU 104 is coupled to the storage control element 106 via a connection 114, such as a bidirectional or unidirectional bus.

Storage control element 106 is coupled to the main memory 102 via a connection 116, such as a bus; to CPUs 104 via connection 114; and to channel subsystem 108 via a connection 118. Storage control element 106 controls, for example, queuing and execution of requests made by CPU 104 and channel subsystem 108.

In an exemplary embodiment, channel subsystem 108 provides a communication interface between host system 101 and control units 110. Channel subsystem 108 is coupled to storage control element 106, as described above, and to each of the control units 110 via a connection 120, such as a serial link. Connection 120 may be implemented as an optical link, employing single-mode or multi-mode waveguides in a Fibre Channel fabric. Channel subsystem 108 directs the flow of information between I/O devices 112 and main memory 102. It relieves the CPUs 104 of the task of communicating directly with the I/O devices 112 and permits data processing to proceed concurrently with I/O processing. The channel subsystem 108 uses one or more channel paths 122 as the communication links in managing the flow of information to or from I/O devices 112. As a part of the I/O processing, channel subsystem 108 also performs the path-management functions of testing for channel path availability, selecting an available channel path 122 and initiating execution of the operation with the I/O devices 112.

Each channel path 122 includes a channel 124 (channels 124 are located within the channel subsystem 108, in one example, as shown in FIG. 1), one or more control units 110 and one or more connections 120. In another example, it is also possible to have one or more dynamic switches (not depicted) as part of the channel path 122. A dynamic switch is coupled to a channel 124 and a control unit 110 and provides the capability of physically interconnecting any two links that are attached to the switch. In another example, it is also possible to have multiple systems, and therefore multiple channel subsystems (not depicted) attached to control unit 110.

Also located within channel subsystem 108 are subchannels (not shown). One subchannel is provided for and dedicated to each I/O device 112 accessible to a program through the channel subsystem 108. A subchannel (e.g., a data structure, such as a table) provides the logical appearance of a device to the program. Each subchannel provides information concerning the associated I/O device 112 and its attachment to channel subsystem 108. The subchannel also provides information concerning I/O operations and other functions involving the associated I/O device 112. The subchannel is the means by which channel subsystem 108 provides information about associated I/O devices 112 to CPUs 104, which obtain this information by executing I/O instructions.

Channel subsystem 108 is coupled to one or more control units 110. Each control unit 110 provides logic to operate and control one or more I/O devices 112 and adapts, through the use of common facilities, the characteristics of each I/O device 112 to the link interface provided by the channel 124. The common facilities provide for the execution of I/O operations, indications concerning the status of the I/O device 112 and control unit 110, control of the timing of data transfers over the channel path 122 and certain levels of I/O device 112 control.

Each control unit 110 is attached via a connection 126 (e.g., a bus) to one or more I/O devices 112. I/O devices 112 receive information or store information in main memory 102 and/or other memory. Examples of I/O devices 112 include card readers and punches, magnetic tape units, direct access storage devices, displays, keyboards, printers, pointing devices, teleprocessing devices, communication controllers and sensor based equipment, to name a few.

One or more of the above components of the I/O processing system 100 are further described in "IBM® z/Architecture Principles of Operation," Publication No. SA22-7832-05, 6th Edition, April 2007; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

Figure 2A:
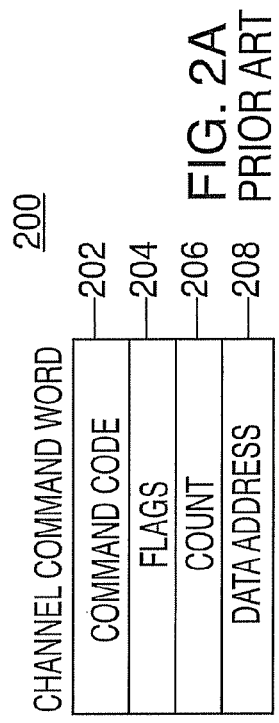
FIG. 2a depicts one example of a prior art channel command word.

In one embodiment, to transfer data between I/O devices 112 and memory 102, channel command words (CCWs) are used. A CCW specifies the command to be executed, and includes other fields to control processing. One example of a CCW is described with reference to FIG. 2a. A CCW 200 includes, for instance, a command code 202 specifying the command to be executed (e.g., read, read backward, control, sense and write); a plurality of flags 204 used to control the I/O operation; for commands that specify the transfer of data, a count field 206 that specifies the number of bytes in the storage area designated by the CCW to be transferred; and a data address 208 that points to a location in main memory that includes data, when direct addressing is employed, or to a list (e.g., contiguous list) of modified indirect data address words (MIDAWs) to be processed, when modified indirect data addressing is employed. Modified indirect addressing is further described in U.S. application Ser. No. 11/464,613, entitled "Flexibly Controlling The Transfer Of Data Between Input/Output Devices And Memory," Brice et al., filed Aug. 15, 2006, which is hereby incorporated herein by reference in its entirety.

One or more CCWs arranged for sequential execution form a channel program, also referred to herein as a CCW channel program. The CCW channel program is set up by, for instance, an operating system, or other software. The software sets up the CCWs and obtains the addresses of memory assigned to the channel program. An example of a CCW channel program is described with reference to FIG. 2b. A CCW channel program 210 includes, for instance, a define extent CCW 212 that has a pointer 214 to a location in memory of define extent data 216 to be used with the define extent command. In this example, a transfer in channel (TIC) 218 follows the define extent command that refers the channel program to another area in memory (e.g., an application area) that includes one or more other CCWs, such as a locate record 217 that has a pointer 219 to locate record data 220, and one or more read CCWs 221. Each read CCW 220 has a pointer 222 to a data area 224. The data area includes an address to directly access the data or a list of data address words (e.g., MIDAWs or IDAWs) to indirectly access the data. Further, CCW channel program 210 includes a predetermined area in the channel subsystem defined by the device address called the subchannel for status 226 resulting from execution of the CCW channel program.

The processing of a CCW channel program is described with reference to FIG. 3, as well as with reference to FIG. 2b. In particular, FIG. 3 shows an example of the various exchanges and sequences that occur between a channel and a control unit when a CCW channel program is executing. The link protocol used for the communications is FICON (Fibre Connectivity), in this example. Information regarding FICON is described in "Fibre Channel Single Byte Command Code Sets-3 Mapping Protocol (FC-SB-3)", T11/Project 1357-D/Rev. 1.6, INCITS (March 2003), which is hereby incorporated herein by reference in its entirety.

Referring to FIG. 3, a channel 300 opens an exchange with a control unit 302 and sends a define extent command and data associated therewith 304 to control unit 302. The command is fetched from define extent CCW 212 (FIG. 2b) and the data is obtained from define extent data area 216. The channel 300 uses TIC 218 to locate the locate record CCW and the read CCW. It fetches the locate record command 305 (FIG. 3) from the locate record CCW 217 (FIG. 2b) and obtains the data from locate record data 220. The read command 306 (FIG. 3) is fetched from read CCW 221 (FIG. 2b). Each is sent to the control unit 302.

The control unit 302 opens an exchange 308 with the channel 300, in response to the open exchange of the channel 300. This can occur before or after locate command 305 and/or read command 306. Along with the open exchange, a response (CMR) is forwarded to the channel 300. The CMR provides an indication to the channel 300 that the control unit 302 is active and operating.

The control unit 302 sends the requested data 310 to the channel 300. Additionally, the control unit 302 provides the status to the channel 300 and closes the exchange 312. In response thereto, the channel 300 stores the data, examines the status and closes the exchange 314, which indicates to the control unit 302 that the status has been received.

The processing of the above CCW channel program to read 4 k of data requires two exchanges to be opened and closed and seven sequences. The total number of exchanges and sequences between the channel and control unit is reduced through collapsing multiple commands of the channel program into a TCCB. The channel, e.g., channel 124 of FIG. 1, uses a TCW to identify the location of the TCCB, as well as locations for accessing and storing status and data associated with executing the channel program. The TCW is interpreted by the channel and is not sent or seen by the control unit.

One example of a channel program to read 4 k of data, as in FIG. 2b, but includes a TCCB, instead of separate individual CCWs, is described with reference to FIG. 4. As shown, a channel program 400, referred to herein as a TCW channel program, includes a TCW 402 specifying a location in memory of a TCCB 404, as well as a location in memory of a data area 406 or a TIDAL 410 (i.e., a list of transfer mode indirect data address words (TIDAWs), similar to MIDAWs) that points to data area 406, and a status area 408. TCWs, TCCBs, and status are described in further detail below.

The processing of a TCW channel program is described with reference to FIG. 5. The link protocol used for these communications is, for instance, Fibre Channel Protocol (FCP). In particular, three phases of the FCP link protocol are used, allowing host bus adapters to be used that support FCP to perform data transfers controlled by CCWs. FCP and its phases are described further in "Information Technology—Fibre Channel Protocol for SCSI, Third Version (FCP-3)," T10 Project 1560-D, Revision 4, Sep. 13, 2005, which is hereby incorporated herein by reference in its entirety.

Figure 5:
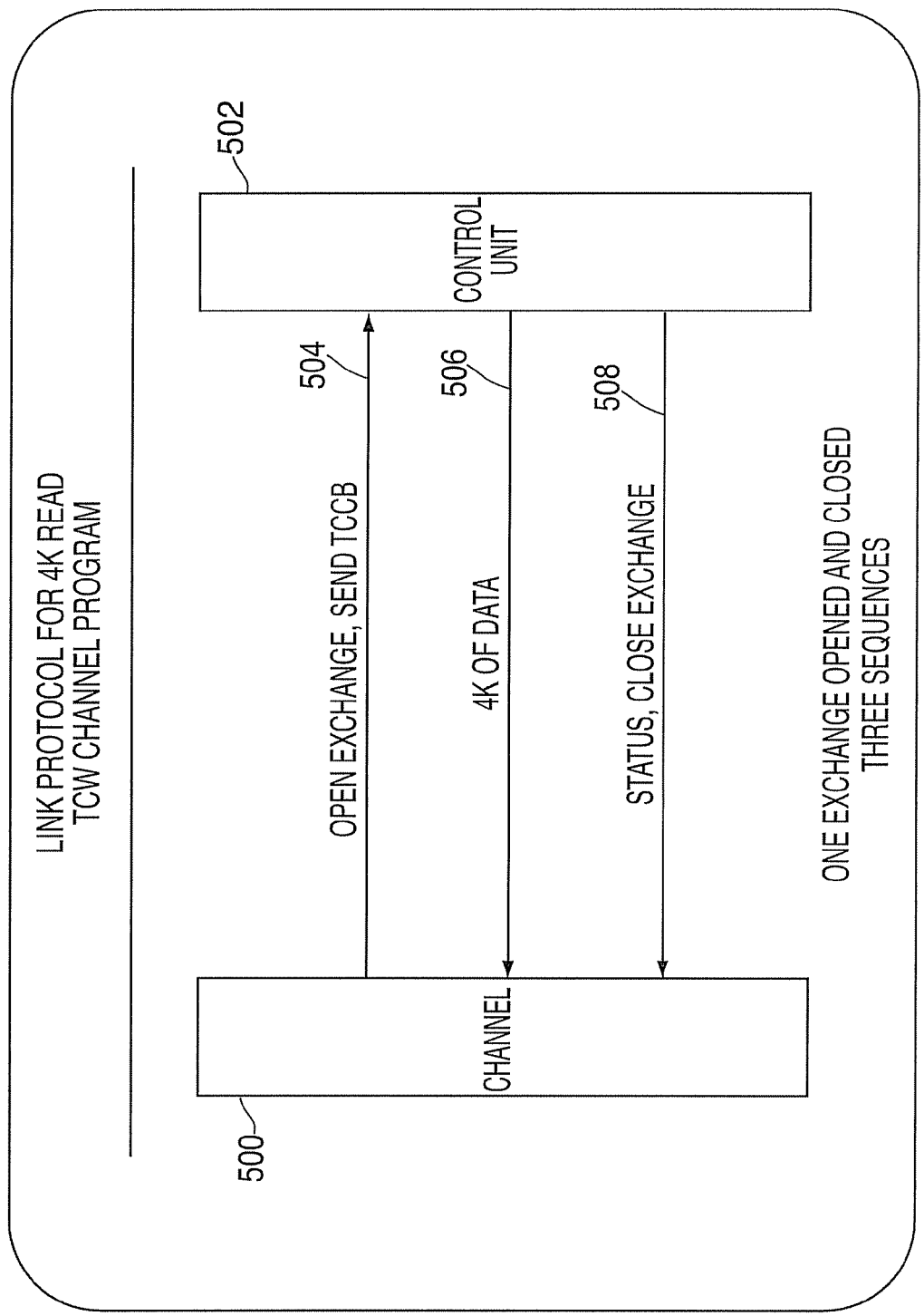
FIG. 5 depicts one embodiment of a link protocol used to communicate between a channel and control unit to execute the transport control word channel program of FIG. 4, in accordance with an aspect of the present invention.

Referring to FIG. 5, a channel 500 opens an exchange with a control unit 502 and sends TCCB 504 to the control unit 502. In one example, the TCCB 504 and sequence initiative are transferred to the control unit 502 in a FCP command, referred to as FCP_CMND information unit (IU) or a transport command IU. The control unit 502 executes the multiple commands of the TCCB 504 (e.g., define extent command, locate record command, read command as device control words (DCWs)) and forwards data 506 to the channel 500 via, for instance, a FCP_Data IU. It also provides status and closes the exchange 508. As one example, final status is sent in a FCP status frame that has a bit active in, for instance, byte 10 or 11 of the payload of a FCP_RSP IU, also referred to as a transport response IU. The FCP_RSP IU payload may be used to transport FICON ending status along with additional status information, including parameters that support the calculation of extended measurement words and notify the channel 500 of the maximum number of open exchanges supported by the control unit 502.

In a further example, to write 4 k of customer data, the channel 500 uses the FCP link protocol phases, as follows:
1. Transfer a TCCB in the FCP_CMND IU.
2. Transfer the IU of data, and sequence initiative to the control unit 502.
3. Final status is sent in a FCP status frame that has a bit active in, for instance, byte 10 or 11 of the FCP_RSP IU Payload. The FCP_RSP_INFO field or sense field is used to transport FICON ending status along with additional status information, including parameters that support the calculation of extended measurement words and notify the channel 500 of the maximum number of open exchanges supported by the control unit 502.

Figure 2B:
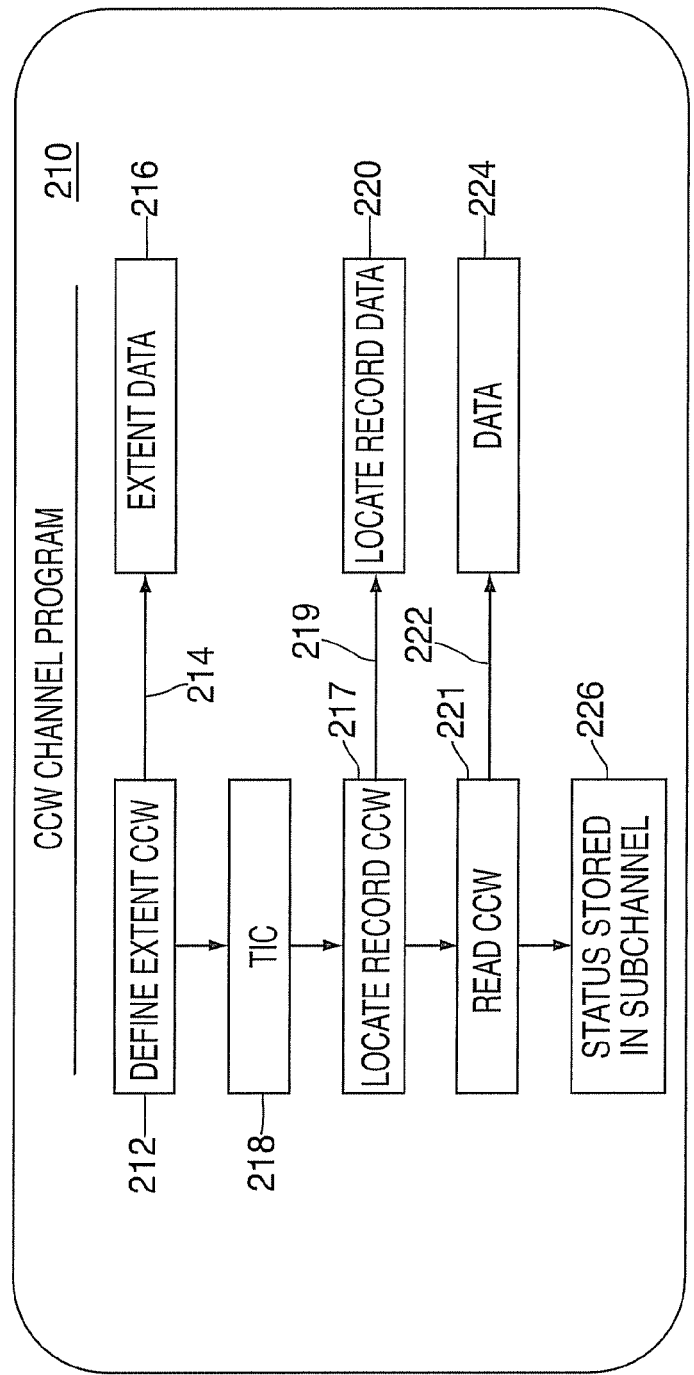
FIG. 2b depicts one example of a prior art channel command word channel program.
Figure 3:
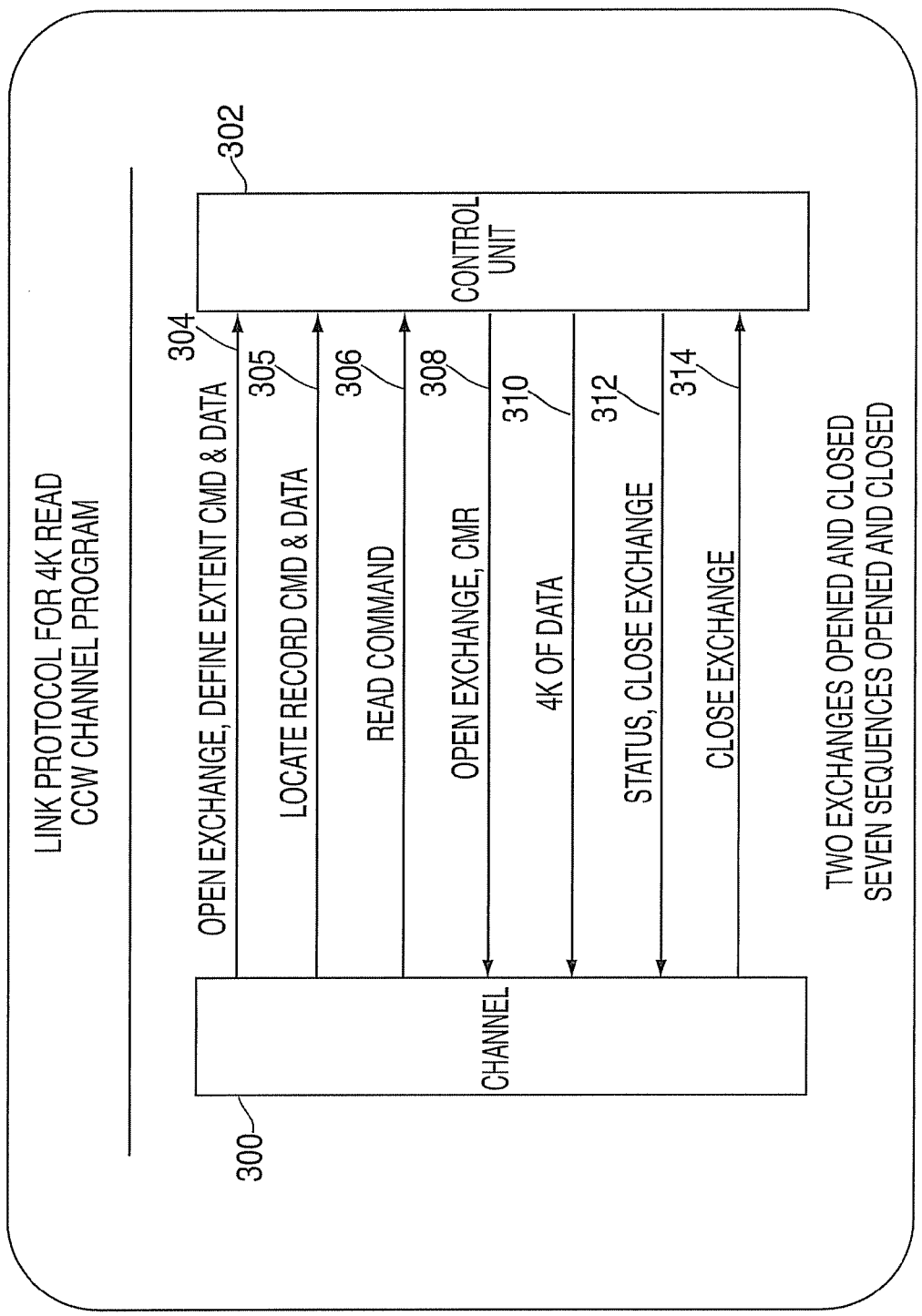
FIG. 3 depicts one embodiment of a prior art link protocol used in communicating between a channel and control unit to execute the channel command word channel program of FIG. 2b.
Figure 4:
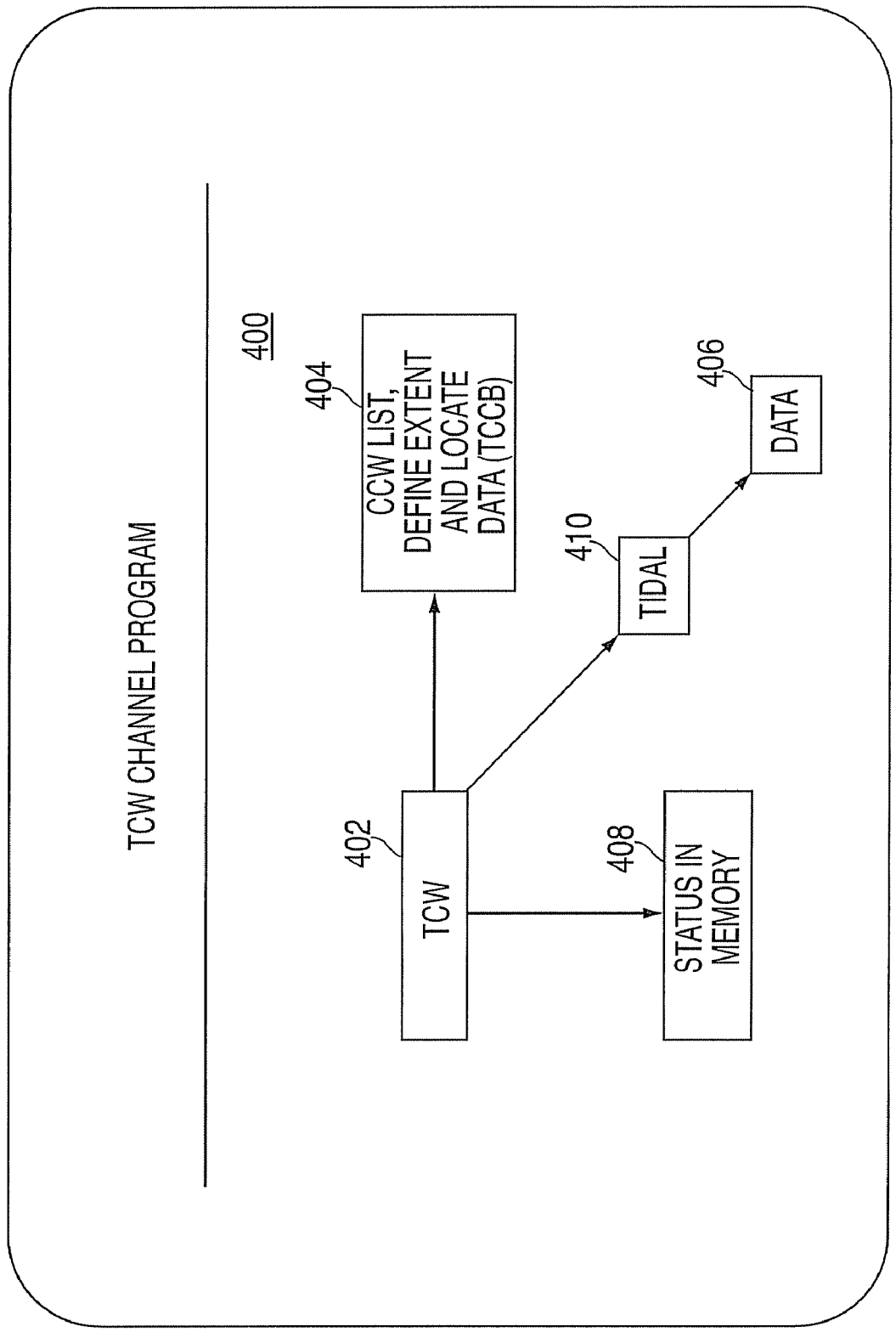
FIG. 4 depicts one embodiment of a transport control word channel program, in accordance with an aspect of the present invention.

By executing the TCW channel program of FIG. 4, there is only one exchange opened and closed (see also FIG. 5), instead of two exchanges for the CCW channel program of FIG. 2b (see also FIG. 3). Further, for the TCW channel program, there are three communication sequences (see FIGS. 4-5), as compared to seven sequences for the CCW channel program (see FIGS. 2b-3).

The number of exchanges and sequences remain the same for a TCW channel program, even if additional commands are added to the program. Compare, for example, the communications of the CCW channel program of FIG. 6 with the communications of the TCW channel program of FIG. 7. In the CCW channel program of FIG. 6, each of the commands (e.g., define extent command 600, locate record command 601, read command 602, read command 604, read command 606, locate record command 607 and read command 608) are sent in separate sequences from channel 610 to control unit 612. Further, each 4 k block of data (e.g., data 614-620) is sent in separate sequences from the control unit 612 to the channel 610. This CCW channel program requires two exchanges to be opened and closed (e.g., open exchanges 622, 624 and close exchanges 626, 628), and fourteen communications sequences. This is compared to the three sequences and one exchange for the TCW channel program of FIG. 7, which accomplishes the same task as the CCW channel program of FIG. 6.

Figure 6:
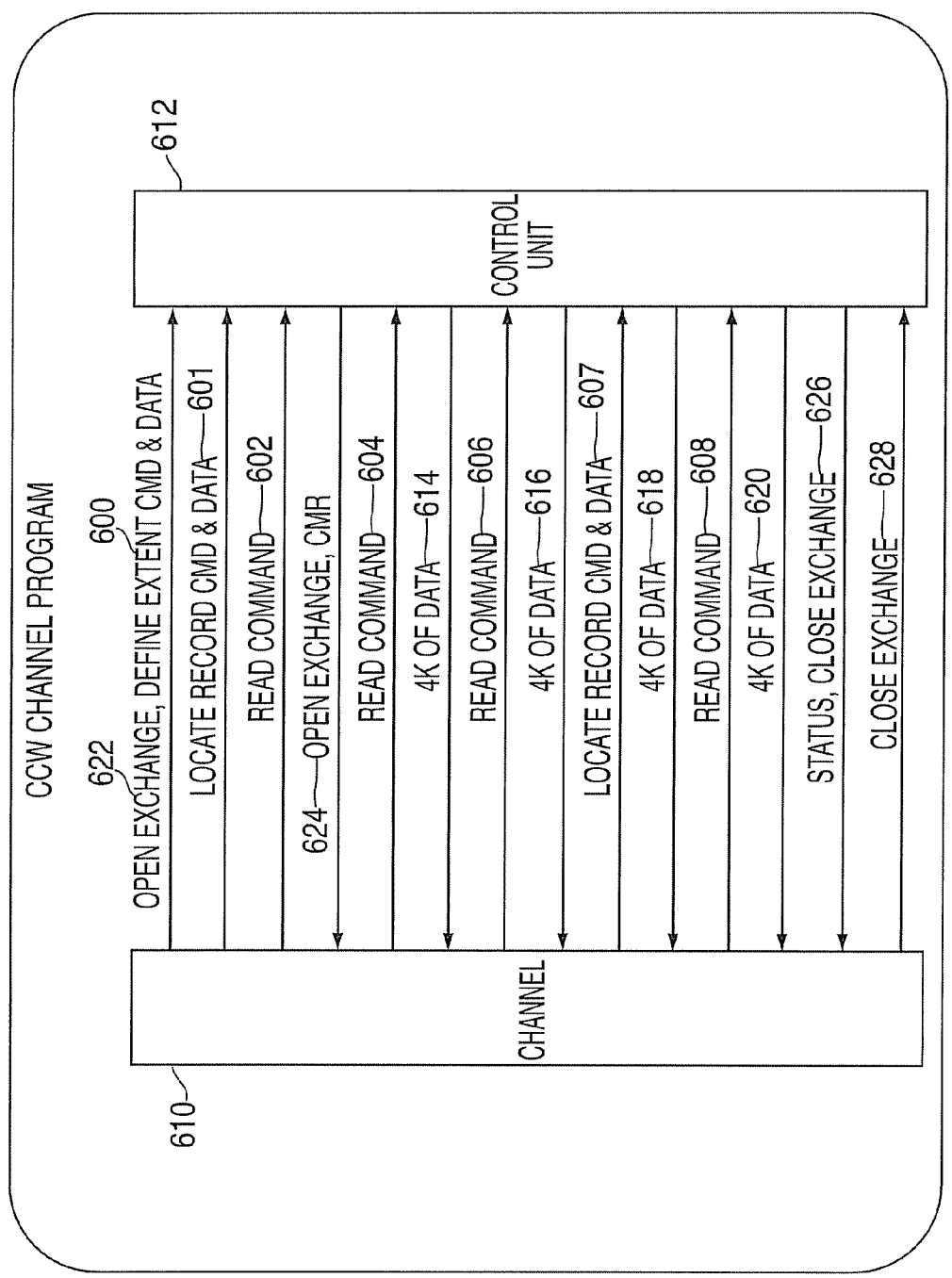
FIG. 6 depicts one embodiment of a prior art link protocol used to communicate between a channel and control unit in order to execute four read commands of a channel command word channel program.
Figure 7:
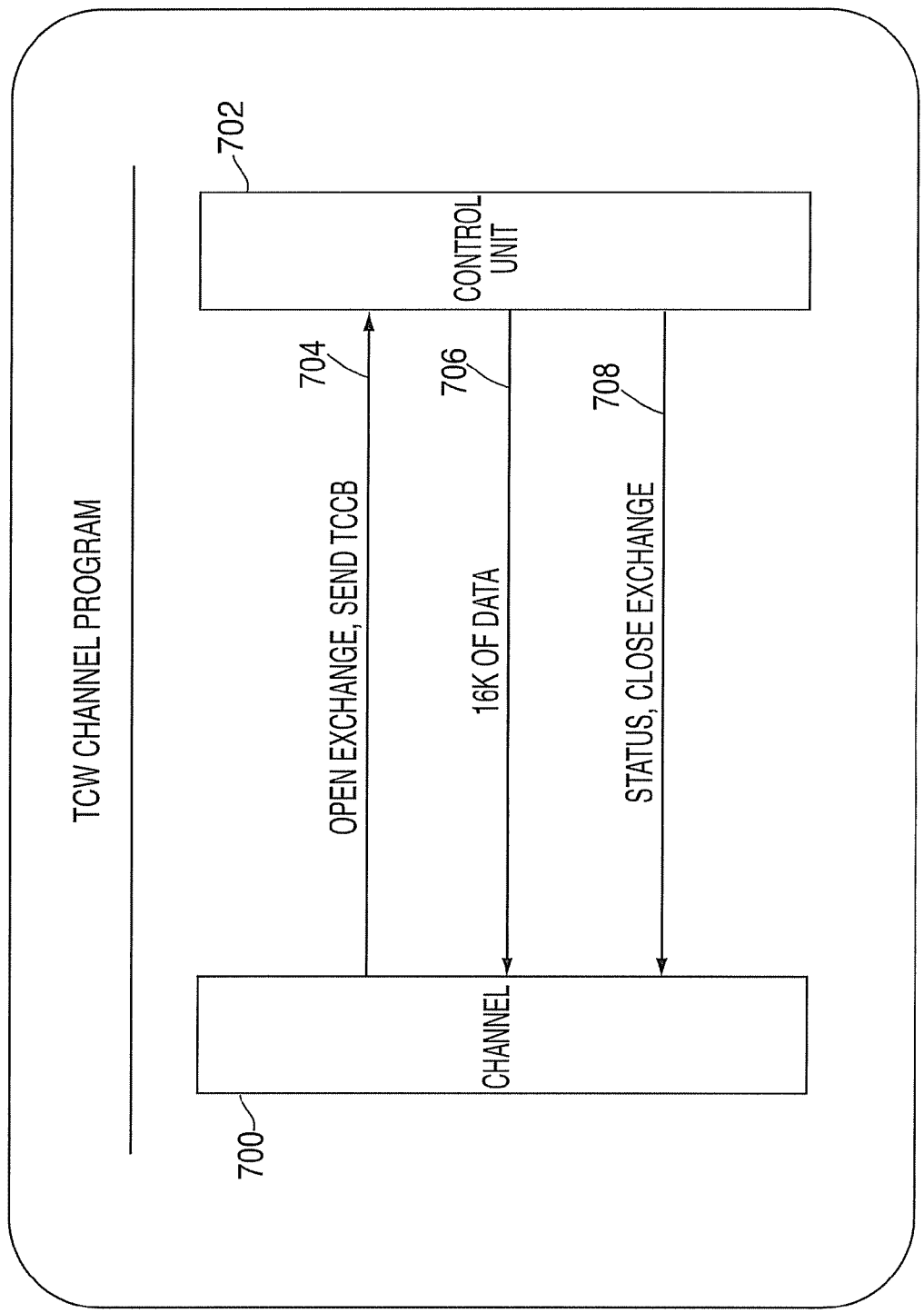
FIG. 7 depicts one embodiment of a link protocol used to communicate between a channel and control unit to process the four read commands of a transport control word channel program, in accordance with an aspect of the present invention.

As depicted in FIG. 7, a channel 700 opens an exchange with a control unit 702 and sends a TCCB 704 to the control unit 702. The TCCB 704 includes the define extent command, the two locate record commands, and the four read commands in DCWs, as described above. In response to receiving the TCCB 704, the control unit 702 executes the commands and sends, in a single sequence, the 16 k of data 706 to the channel 700. Additionally, the control unit 702 provides status to the channel 700 and closes the exchange 708. Thus, the TCW channel program requires much less communications to transfer the same amount of data as the CCW channel program of FIG. 6.

Figure 8:
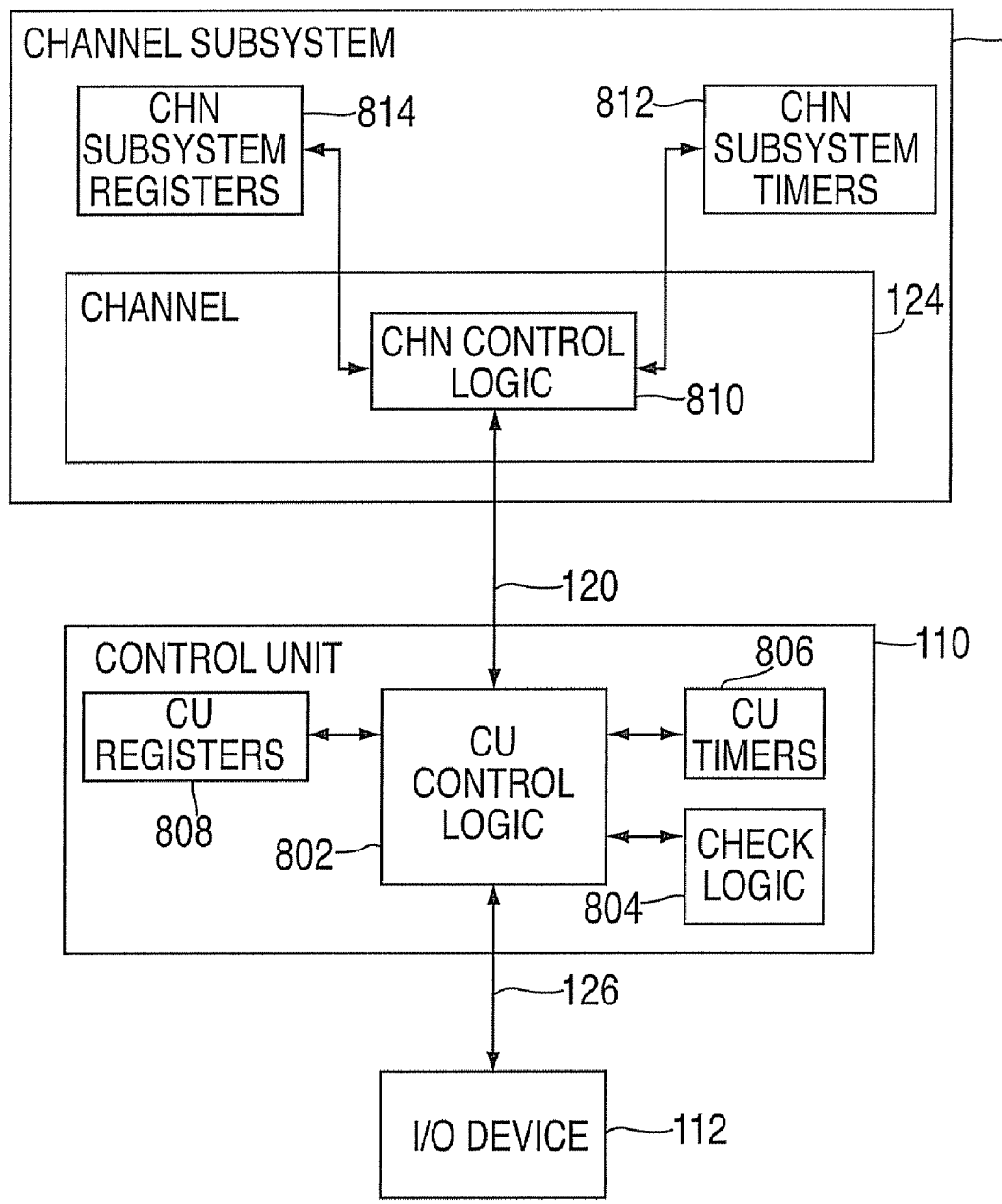
FIG. 8 depicts one embodiment of a control unit and a channel, in accordance with an aspect of the present invention.

Turning now to FIG. 8, one embodiment of the control unit 110 and the channel 124 of FIG. 1 that support TCW channel program execution are depicted in greater detail. The control unit 110 includes CU control logic 802 to parse and process command messages containing a TCCB, such as the TCCB 704 of FIG. 7, received from the channel 124 via the connection 120. The CU control logic 802 can extract DCWs and control data from the TCCB received at the control emit 110 to control a device, for instance, I/O device 112 via connection 126. The CU control logic 802 sends device commands and data to the I/O device 112, as well as receives status information and other feedback from the I/O device 112. The CU control logic 802 uses check logic 804 to perform various checks of the command messages received at the control unit 110. The check logic 804 may also determine termination reason codes for reporting exception conditions to the channel subsystem 108 as part of a response message.

The CU control logic 802 can access and control other elements within the control unit 110, such as CU timers 806 and CU registers 808. The CU timers 806 may include multiple timer functions to track how much time a sequence of I/O operations takes to complete. The CU timers 806 may further include one or more countdown timers to monitor and abort I/O operations and commands that do not complete within a predetermined period. The CU registers 808 can include fixed values that provide configuration and status information, as well as dynamic status information that is updated as commands are executed by the CU control logic 802. The control unit 110 may further include other buffer or memory elements (not depicted) to store multiple messages or status information associated with communications between the channel 124 and the I/O device 112. The CU registers 808 may include a maximum control unit exchange parameter that defines the maximum number of open control unit exchanges that the control unit 110 supports.

The channel 124 in the channel subsystem 108 includes multiple elements to support communication with the control unit 110. For example, the channel 124 may include CHN control logic 810 that interfaces with CHN subsystem timers 812 and CHN subsystem registers 814. In an exemplary embodiment, the CHN control logic 810 controls communication between the channel subsystem 108 and the control unit 110. The CHN control logic 810 may directly interface to the CU control logic 802 via the connection 120 to send commands and receive responses, such as transport command and response IUs. Alternatively, messaging interfaces and/or buffers (not depicted) can be placed between the CHN control logic 810 and the CU control logic 802. The CHN subsystem timers 812 may include multiple timer functions to track how much time a sequence of I/O operations takes to complete, in addition to the time tracked by the control unit 110. The CHN subsystem timers 812 may further include one or more countdown timers to monitor and abort command sequences that do not complete within a predetermined period. The CHN subsystem registers 814 can include fixed values that provide configuration and status information, as well as dynamic status information, updated as commands are transported and responses are received.

One example of a command message 900, e.g., a transport command IU, communicated from the channel subsystem 108 to the control unit 110 to execute a TCW channel program is depicted in FIG. 9. The command message 900 includes a header 902, a transport command header (TCH) 904, a transport command area header (TCAH) 906, a transport command area (TCA) 908, and a transport command area trailer (TCAT) 910. In an exemplary embodiment, the TCCB 404 of FIG. 4 includes the TCH 904, TCAH 906, TCA 908, and TCAT 910.

The header 902 may include multiple words as address header 912, defining the highest level of header in the command message 900. The header 902 may include information such as channel and control unit image IDs and a device address.

The TCH 904 includes a command reference number/task 914, which may be set to a reserved value, e.g., zero, while operating in transport mode. The TCH 904 also includes L1 length 916 and read/write field 918. The L1 length 916 defines the length of the TCA 908 in words+1. The L1 length 916 can be used to limit and define the size of the TCA 908. The read/write field 918 defines whether read data, write data, or no data is being transferred in the command message 900, where a read is a transfer from the control unit 110 to the channel subsystem 108.

The TCAH 906 includes format field 920 and control field 922. The format field 920 and control field 922 may be set to fixed values, such as 7 F hexadecimal and zero respectively, to indicate that a variable length format is used, as defined by SPC-4. SPC-4 is further described in "SCSI Primary Commands—4 (SPC-4)", Project T10/1731-D, Rev 11, INCITS (May 2007), which is hereby incorporated herein by reference in its entirety. The TCAH 906 additionally includes reserved fields 924 and 926, as well as L2 length 928. The L2 length 928 is also referred to as transport-command-area length (TCAL), and may represent the number of bytes after this position in the command message 900. The L2 length 928 limits the size of the TCA 908. The TCAH 906 further includes a service action code 930, reserved field 932, priority 934, and reserved field 936. The service action code 930 defines the type of DCWs used in the TCA 908. The priority 934 can be set equivalent to a priority byte of a FICON command header as defined in FC-SB-3.

The TCA 908 includes DCW one and control data 940, DCW two 942, DCW three 944, and DCW four 946. The DCW one and control data 940 includes DCW fields such as a command 948, flags field 950, a reserved field 952, control data (CD) count 954, and data byte count 956. The command 948 may be equivalent to a CCW command byte, but directly interpreted by the control unit 110 rather than the channel subsystem 108. The flags field 950 includes reserved bits as well as one or more bits assigned to particular functions, such as indicating whether an additional DCW exists in the TCA 908 as part of a command chain. The CD count 954 is the byte count of control data 958. The CD count 954 may be padded up to the next 4-byte boundary so that subsequent DCWs start on a 4-byte boundary. The data byte count 956 is a four-byte count of data without padding, e.g., customer data. The control data 958 exists when the CD count 954 is not zero. In the exemplary command message 900, the DCW two 942, DCW three 944, and DCW four 946 contain substantially similar fields as the DCW one and control data 940. For example, command 960, 970, and 980 are formatted in a similar fashion as the command 948. Furthermore, flags field 962, 972, and 982 are formatted similar to the flags field 950. Additionally, CD count 966, 976, and 986 are formatted similar the CD count 954, and data byte count 968, 978, and 988 are similarly formatted to the data byte count 956. Although only four DCWs, including one DCW with control data (i.e., DCW one and control data 940) are depicted in the command message 900, it will be understood that a varying number of DCWs with and without control data can be included in the command message 900, including a single DCW.

The TCAT 910 includes a longitudinal redundancy check (LRC) word 990 calculated on the entire command message 900. The LRC word 990 can be generated through applying an exclusive—or operation to an initial seed value with each field included in the LRC calculation in succession. The TCAT 910 also includes a transport data byte count 992 indicating the total number of bytes transferred for a read or write I/O operation.

Upon sending the command message 900 to the control unit 110, the control unit 110 may detect error or exception conditions with the contents of the command message 900. The control unit 110 can also identify exception conditions that result in early termination of an I/O operation, including errors detected by the I/O device 112. The control unit 110 reports reason code and qualifier information back to the channel subsystem 108 in a response message to assist in debugging and fault isolation.

One example of a response message 1000, e.g., a transport response IU, communicated from the control unit 110 to the channel 124 of the channel subsystem 108 upon completion of a TCW channel program is depicted in FIG. 10. The response message 1000 provides status information to the channel 124 and may indicate that an open exchange between the channel 124 and the control unit 110 should be closed. The status information provided when a TCW channel program (e.g., as depicted in FIGS. 5 and 7) is analyzed and/or executed includes additional information beyond the status information sent upon completion of a CCW channel program (e.g., as depicted in FIGS. 3 and 6). The response message 1000 includes a status section 1002 and an extended status section 1004. When the channel 124 receives the response message 1000, it stores parts of status section 1002 in the subchannel for the device the TCW was operating with and the extended status section 1004 in status area 408 defined by the TCW 402 of FIG. 4 associated with the TCW channel program that triggered the response message 1000. For example, a TCW can designate a section of main memory 102 of FIG. 1 for storage of the extended status section 1004.

The status section 1002 of the response message 1000 can include multiple fields, such as an address header 1006, status flags one 1008, maximum control unit exchange parameter 1010, response flags 1012, response code 1014, residual count 1016, response length 1018, reserved location 1020, SPC-4 sense type 1022, status flags two 1024, status flags three 1026, device status 1028, and an LRC word 1030. Each field in the status section 1002 is assigned to a particular byte address to support parsing of the response message 1000. Although one arrangement of fields within the status section 1002 is depicted in FIG. 10, it will be understood that the order of fields can be rearranged to alternate ordering within the scope of the disclosure. Moreover, fields in the response message 1000 can be omitted or combined within the scope of the invention, e.g., combining status flags two 1024 and three 1026 into a single field.

In an exemplary embodiment, the address header 1006 is set to the same value as the value received by the control unit 110 in the TCCB that initiated the TCW channel program. Although the address header 1006 is not required, including the address header 1006 may support testing to trace command and response messages on an I/O device 112 while multiple I/O devices 112 are being accessed.

Status flags one 1008 may indicate information such as the success status of an I/O operation. Multiple bits within the status flags one 1008 can provide additional status information. In an exemplary embodiment, bits 0-3 of the status flags one 1008 are reserved, while bits 4 to 7 are encoded with the following definition:
  1. Null. No exception condition was encountered with the operation.
  2. Device level exception. The I/O device 112 was not available.
  3. Link reject. A logical path was not established to the control unit 110.
  4. Resetting event. A special device status is included to indicate an event that occurred relative to the I/O device 112.
  5. Device requested a program check, which may possibly be escalated to an interface control check (IFCC). The control unit 110 sets this encode when certain conditions are identified in the extended status 1004 for the I/O device 112, as described in greater detail herein.
  6. Device requested a program check. The control unit 110 sets this encode when specific conditions are identified in the extended status 1004, as described in greater detail herein.
  7. to 15. Reserved.

The maximum control unit exchange parameter 1010 identifies the maximum number of exchanges that the control unit 110 allows the channel 124 to open to it. The maximum control unit exchange parameter 1010 may represent a base number to increment and/or scale to establish the maximum n-umber of exchanges supported.

In an exemplary embodiment, the response flags field 1012 uses the standard definition as defined in FCP and can be set to a default value, e.g., two. The response code 1014 may be equivalent to a Small Computer System Interface (SCSI) status field and can be set to a default value, such as zero. The residual count 1016 for read or write commands indicates the difference between how many bytes were commanded to be read or written versus the number of bytes that actually were read or written. The channel 124 checks that the channel 124 received or sent the same amount of data that the control unit 110 sent or received using the residual count 1016. If there is a disagreement the channel 123 terminates the operation with an IFCC set. The response length 1018 is an additional count of bytes of information in the response message 1000 after the reserved location 1020. The response length 1018 supports variable sized response messages 1000. The SPC-4 sense type 1022 can be assigned to a value of 7 F hexadecimal which identifies this response IU as vender unique.

In one embodiment, the status flags two 1024 provides status for validity of the residual count 1016, an initial status indication, and a request to generate a log record of an event. Invalidity of the residual count 1016 may result in an IFCC because of a link protocol error. Status flags three 1026 is set to a value of one to indicate that extended status 1004 is included as part of the response message 1000. The device status 1028 relays status information generated by the I/O device 112. The LRC word 1030 is a check word that covers the other fields in the status section 1002 of the response message 1000 to verify the integrity of the status section 1002. The LRC word 1030 call be generated through applying an exclusive—or operation to an initial seed value with each field included in the LRC calculation in succession.

The extended status section 1004 provides information to the channel subsystem 108 and the OS 103 associated with operating the control unit 110 in a transport mode capable of running a TCW channel program. The extended status section 1004 may support configurable definitions with different type status definitions for each type. In an exemplary embodiment, the extended status section 1004 includes a transport status header (TSH) 1032, a transport status area (TSA) 1034, and an LRC word 1036 of the TSH 1032 and the TSA 1034. The TSH 1032 may include extended status length 1040, extended status flags 1042, a DCW offset 1044, a DCW residual count 1046, and a reserved location 1048. The TSH 1032 is common for the different formats, with each format defined by a type code in the extended status flags 1042. The TSA 1034 may include a reserved value 1050, a termination reason code 1052, reason code qualifier (RCQ) words 1054, and appended device sense data 1056. Each of these fields is described in greater detail in turn.

The extended status length 1040 is the size of the extended status section 1004. In an exemplary embodiment, the extended status flags 1042 has the following definition:
  Bit 0—The DCW offset 1044 is valid.
  Bit 1—The DCW residual count 1046 is valid.
  Bit 2—This bit set to a one informs the OS 103 of FIG. 1 in a definitive manner when the control unit 110 had to access slow media for data, e.g., a cache miss.
  Bit 3—Time parameters are valid. The type code set to a one and this bit set to a one indicates that all of time parameters are valid when time parameters are included in the response message 1000.
  Bit 4—Reserved.
  Bits 5 to 7—These three bits are the type code that defines the format of the TSA 1034 of the extended status section 1004. The names of the encodes are:
    0. Reserved.
    1. I/O Status. The extended status section 1004 contains valid ending status for the transport-mode I/O operation.

2. I/O Exception. The extended status section 1004 contains information regarding termination of the transport-mode I/O operation due to an exception condition.

3. Interrogate Status. The extended status section 1004 contains status for an interrogate operation.

4. to 7. Reserved.

The DCW offset 1044 indicates an offset in the TCCB of a failed DCW. Similarly, the DCW residual count 1046 indicates the residual byte count of a failed DCW (i.e., where execution of the DCWs was interrupted).

In an exemplary embodiment, the TSA 1034 definition when the type code of ES flags 1042 indicates a type of I/O Exception includes a reserved field 1050, termination reason codes 1052, reason code qualifier (RCQ) words 1054, and optionally, appended device sense data 1056. The termination reason codes 1052 indicate the reason for the termination of the I/O operation. The RCQ words 1054 include values encoded for meanings corresponding to specific termination reason codes 1052. Exemplary termination reason codes 1052 include:

0. Null value for no information.

1. Transport command IU transport failure. The I/O device 112 detected an invalid transport command IU, e.g., command message 900 of FIG. 9.

2. Invalid cyclic redundancy check (CRC) detected on output data. The control unit 110 detected an invalid CRC while receiving output data.

3. Incorrect transport command KY length specification.

4. TCAH specification error.

5. DCW specification error. There is an error with the DCW as designated by the DCW offset 1044.

6. Transfer-direction specification error. The command specified by the DCW designated by the DCW offset 1044 specifies a direction of data transfer that disagrees with the transfer direction specified in the TCH 904.

7. Transport-count specification error.

8. Two I/O operations active to the same device address. The I/O device 112 responds with this status to both I/O operations that are active for the device address. When this error is detected the control unit 110 also sets encode 4 "Device requested program check, possible IFCC" in status flags one 1008. When encode 4 in status flags one 1008 is detected by the channel 124, the channel 124 may notify the OS 103 of the device requested program check with a possible IFCC.

9. to 255. Reserved.

When termination reason codes 1052 indicate a transport command IU transport failure (i.e., a value of 1), the RCQ words 1054 can include the following information:

0. No additional information.

1. The length of the transport command IU received (e.g., command message 900) does not match the L1 length 916.

2. LRC error. The LRC 990 does not validate the transport command IU.

3. to 255. Reserved.

When this error is detected the control unit 110 also sets encode 4 "Device requested program check, possible IFCC" in status flags one 1008. When encode 4 in status flags one 1008 is detected by the channel 124, the channel 124 may notify the OS 103 of the device requested program check with a possible IFCC.

When termination reason codes 1052 indicates an invalid CRC is detected on output data (i.e., a value of 2), the RCQ words 1054 can include the following information that identifies the starting and ending byte of the unit of data that was detected as being corrupted:

Response message 1000, word 12, (RCQ word 0) contains a 32-bit unsigned integer offset of the first output data byte for which the invalid CRC was detected.

Response message 1000, word 13, (RCQ word 1) contains the 32-bit unsigned integer offset of the last output-data byte for which the invalid CRC was detected. When this error is detected the control unit 110 also sets encode 4 "Device requested program check, possible IFCC" in status flags one 1008. When encode 4 in status flags one 1008 is detected by the channel 124, the channel 124 may notify the OS 103 of the device requested program check with a possible IFCC. The OS 103 determines if this error is a program check or an IFCC.

When termination reason codes 1052 indicate an incorrect transport command IU length specification (i.e., a value of 3), the RCQ words 1054 can include the following:

0. No additional information.

1. The value specified by the L2 length 928 is not 8 greater than the value specified by the L1 length 916 in the transport command IU for this operation (command message 900).

2. The value specified by the L2 length 928 is less than 20 or greater than 252.

3. to 255 Reserved.

When this error is detected the control unit 110 also sets encode 5 "Device requested program check" in status flags one 1008. When encode 5 in status flags one 1008 is detected by the channel 124, the channel 124 may notify the OS 103 of the device requested program check.

When termination reason codes 1052 indicates a TCAH specification error (i.e., a value of 4), the RCQ words 1054 can include the following:

0. No additional information.

1. Format-field specification error. The format field 920 in the TCAH 906 contains an unrecognized value.

2. Reserved field specification error. A reserved field in the TCAH 906 does not contain zeros, e.g., reserved field 924, 926, 932 or 936.

3. Service action code field specification error. The service action code field 930 contains an unrecognized value or a value that is incorrect for a command specified by the DCW designated by the DCW offset 1044.

4. to 255 Reserved.

When this error is detected the control unit 110 also sets encode 5 "Device requested program check" in status flags one 1008. When encode 5 in status flags one 1008 is detected by the channel 124, the channel 124 may notify the OS 103 of the device requested program check.

When termination reason codes 1052 indicates a DCW specification error at DCW offset 1044 (i.e., a value of 5), the RCQ words 1054 can include the following:

0. No additional information.

1. Reserved field specification en-or. A reserved field in the DCW does not contain zeros, e.g., reserved field 952, 964, 974, or 984.

2. Flags field command chaining specification error. Either of the following is true: a command-chaining flag is one and the offset of the next DCW is such that all or part of the next DCW extends past the end of the TCA 908, or a command-chaining flag is zero and more than 3 unused bytes remain in the TCA 908.

3. Control data count field specification error. Either of the following is true: the command specified by the DCW requires control data and the CD count field (e.g., CD count 954, 966, 976, or 986) contains zeros, or the CD count field (e.g., CD count 954, 966, 976, or 986) specifies control data past the end of the TSA 908.

4. to 255 Reserved.

When this error is detected the control unit 110 also sets encode 5 "Device requested program check" in status flags one 1008. When encode 5 in status flags one 1008 is detected by the channel 124, the channel 124 may notify the OS 103 of the device requested program check.

When termination reason codes 1052 indicates a transfer-direction specification error (i.e., a value of 6), the RCQ words 1054 can include the following:

0. No additional information.
1. Read-direction specification error. The DCW specifies an input operation, but the R-bit in the read/write field 918 is zero.
2. Write-direction specification error. The DCW specifies an output operation, but, the W-bit in the read/write field 918 is zero.
3. to 255 Reserved.

When this error is detected the control unit 110 also sets encode 5 "Device requested program check" in status flags one 1008. When encode 5 in status flags one 1008 is detected by the channel 124, the channel 124 may notify the OS 103 of the device requested program check.

When termination reason codes 1052 indicates a transport-count specification en-or (i.e., a value of 7), the RCQ words 1054 can include the following:

0. No additional information.
1. Read count specification error. The transport data byte count 992 specifies a value that is not equivalent to the total count of data bytes specified by the DCWs in the TCA 908.
2. Write count specification error. The transport data byte count 992 specifies a value that is not equivalent to the total count of data bytes specified by the DCWs in the TCA 908.
3. to 255 Reserved.

When this error is detected the control unit 110 also sets encode 5 "Device requested program check" in status flags one 1008. When encode 5 in status flags one 1008 is detected by the channel 124, the channel 124 may notify the OS 103 of the device requested program check.

The appended device sense data 1056 is supplemental status that the control unit 110 provides conditionally in response to an active unit check (UC) bit in the device status 1028. The amount of data in the appended device sense data 1056 can be determined by subtracting a fixed amount (e.g., 32 bytes) from the ES length field 1040.

The LRC word 1036 is a longitudinal redundancy check word of the TSH 1032 and the TSA 1034, calculated in a similar fashion as the LRC word 1030 in the status 1002 section of the response message 1000. The LRC word 1036 can be calculated on a variable number of words, depending upon the number of words included in the appended device sense data 1056.

Figure 11:
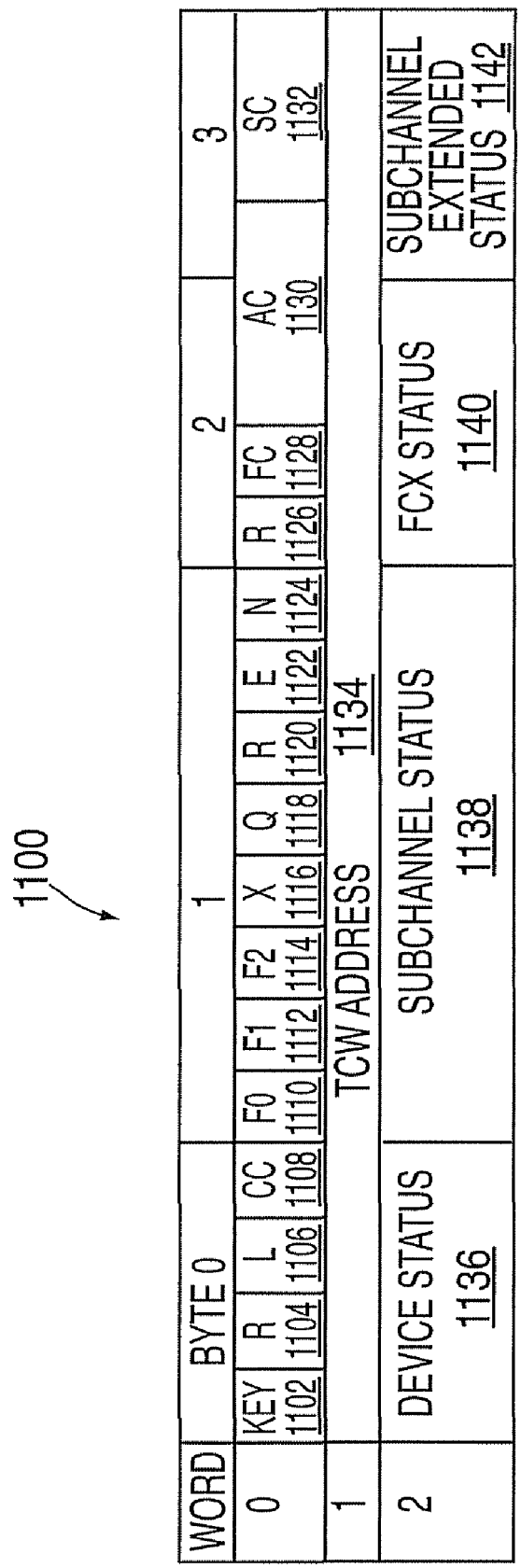
FIG. 11 depicts one embodiment of a portion of an interrupt response block in a host system, in accordance with an aspect of the present invention.

In response to an exception condition detected at the channel subsystem 108, an I/O interrupt is communicated to one or more of the CPUs 104. The I/O interrupt includes an interrupt response block (IRB) 1100, an example portion (words 0-3) of which is depicted in FIG. 11. The IRB 1100 includes a key 1102, a reserved field (R) 1104, an extended status word (ESW) format field (L) 1106, and a deferred condition code field (CC) 1108. The IRB 1100 also includes IRB format fields F0 1110, F1 1112, F2 1114, and IRB format control field (X) 1116. The IRB 1100 further includes interrogate complete field (Q) 1118, a reserved field (R) 1120, an extended control field (E) 1122, a path not operational field (N) 1124, a reserved field (R) 1126, a function control field (FC) 1128, an activity control field (AC) 1130, and a status control field (SC) 1132. The IRB 1100 additionally includes a TCW address 1134, a device status 1136, a sub-channel status 1138, a FICON-extended (FCX) status 1140, and a sub-channel extended status 1142.

In an exemplary embodiment, the key 1102, L 1106, CC 1108, E 1122, N 1124, FC 1128, and SC 1132 are unchanged from the IRB format as defined in "IBM® z/Architecture Principles of Operation," Publication No. SA22-7832-05, 6th Edition, April 2007. When the IRB format control field X 1116 is set to a one, the IRB format fields F0 1110, F1 1112, and F2 1114 are reserved for FCX use. The Q 1118 indicates completion of an interrogate operation. The AC 1130 provides activity status information, such as pending status, sub-channel active status, and device active status. The TCW address 1134 indicates the TCW being executed when the interrupted occurred.

The device status 1136 is copied from the device status 1028 of the response message 1000 of FIG. 10. The sub-channel status 1138 includes various checks and reserved values, e.g., program, protect, data, and control checks. The FCX status 1140 is copied from the status flags three 1026 of the response message 1000 of FIG. 10. The sub-channel extended status 1142 provides an extension to the sub-channel status 1138, adding details as to why a particular check condition occurred. For example, bit 0 of the sub-channel extended status 1142 can be set to indicate that a program check, protect check, or IFCC was the result of an interrogate operation. A program check may be the result of a TCW channel program en-or detected by the control unit 110. When a program check occurs, encoded values in bits 1 to 7 of the sub-channel extended status 1142 can convey the following information:

0. Null value used for program check conditions that do not require a value in the sub-channel extended status 1142.
1. Storage-Request limit exceeded. A model-dependent number of storage requests have been exceeded for the requested block of data because software programming built an impossible to execute channel program.
2. Program check when the count in the transport command IU did not match the count the device expected.
3. Transport mode (i.e., TCW channel programs) is not supported in the control unit 110. Execution of transport mode I/O was attempted to a device that does not support transport mode.
4. Fibre Channel Extension (FCX) is not supported in the channel 124. Execution of transport mode I/O was attempted to a channel that does not support transport mode.
5. Reserved.
6. Program check on the TCW. The channel 124 detected an invalid TCW.
7. Device detected program check, possible IFCC. This encode is set if the channel 124 received encode 4 in status flags one 1008. This error may be caused either by invalid control block structures in memory 102 or the information was corrupted on its way to the I/O device 112. The OS 103 may escalate this to an IFCC, if all of the parameters and control blocks in memory 102 are correct for the operation. The channel 124 may create a log on this error.
8. Device detected program check. This encode is set if the channel 124 received encode 5 in status flags one 1008. This error may be caused by invalid control block structures that were detected by the I/O device 112.
9. to 31. Reserved.

Any one of the following encodes may be set in bits 1 to 7 as result of a protect check, invalid address program check) or uncorrectable error (channel control check or channel data check) received as a response to a storage operation:

32. Storage exception on a TCW fetch. The following errors can cause this:

a. Invalid address on a TCW fetch. Program check is set in the sub-channel status 1138.
b. Protected address on a TCW fetch. Protect check will be set in the sub-channel status 1138.
c. An uncorrectable error on a TCW fetch. Channel control check is set in the sub-channel status 1138.

33. Storage exception on a TSB store. The following errors can cause this:
   a. Invalid address on a TSB store. Program check is set in the sub-channel status 1138
   b. Protected address on a TSB store. Protect check is set in the sub-channel status 1138.

34. Storage exception on a transport command IU fetch. The following errors can cause this:
   a. Invalid address on a TCCB fetch. Program check is set in the sub-channel status 1138.
   b. Protected address on a TCCB fetch. Protect check is set in the sub-channel status 1138.
   c. An uncorrectable error on a TCCB fetch. Channel control check is set in the sub-channel status 1138.

35. Storage exception on a TIDAL fetch. The following errors can cause this:
   a. Invalid address on a TIDAL fetch. Program check is set in the sub-channel status 1138.
   b. Protected address on a TIDAL fetch. Protect check is set in the sub-channel status 1138.
   c. An uncorrectable error on a TIDAL fetch. Channel control check is set in the sub-channel status 1138.

36. Storage exception on a data access. The following errors can cause this:
   a. Invalid address on a data access. Program check is set in the sub-channel status 1138.
   b. Protected address on a data access. Protect check is set in the sub-channel status 1138.
   c. An uncorrectable error on a data access. Channel data check is set in the sub-channel status 1138.

37. to 63 reserved.

Any one of the following encodes may be set in bits 1 to 7 as result of an IFCC.

64. IFCC because of a CRC error detected by the channel 124 on data being received from the control unit 110.
65. Reserved.
66. IFCC because of a Fibre Channel link protocol error.
67. IFCC occurred because a purge path command did not complete.
68. IFCC occurred on a purge path command because of an abort.
69. IFCC because a TCW residual count did not match the residual count 1016. This can occur because the channel 124 or control unit 110 did not receive all of data IUs.
70. Invalid LRC 1030.
71. Invalid LRC 1036.
72. to 127 reserved.

Figure 12:
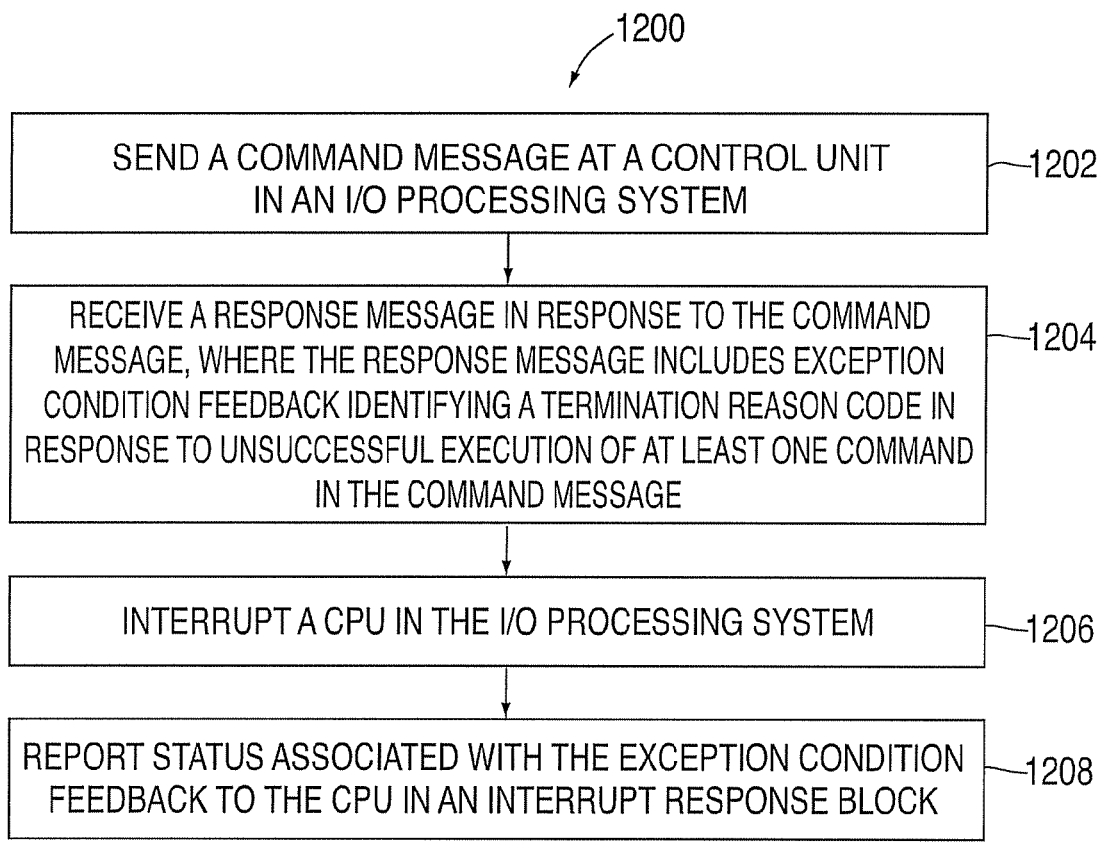
FIG. 12 depicts one embodiment of a process for handling of exception condition feedback at a channel subsystem from a control unit in an input/output processing system.

Turning now to FIG. 12, a process 1200 for handling exception condition feedback at a channel subsystem of an I/O processing system using data from a control unit will now be described in accordance with exemplary embodiments, and in reference to the I/O processing system 100 of FIG. 1. At block 1202, the channel 124 in the channel subsystem 108 sends a command message to the control unit 110. The command message may be a transport command IU, including a TCCB with multiple DCWs as part of a TCW channel program, e.g., command message 900 of FIG. 9. The control unit 110 receives the command message, parses it, and may initiate I/O operations as commanded in the DCWs to the I/O device 112. When an exception condition is detected at the control unit 110, the control unit 110 reports status information to the channel 124 in a transport response IU message (e.g., response message 1000 of FIG. 10, including a status section 1002 and an extended status section 1004).

At block 1204, the channel subsystem 108 receives the transport response IU message in response to sending the command message to the control unit 110. Communication between the channel subsystem 108 and the control unit 110 may be managed by the CU control logic 802 and the CHN control logic 810 of FIG. 8 for a specific channel 124 of the channel subsystem 108. The transport response IU message includes exception condition feedback identifying a termination reason code (e.g., termination reason codes 1052 of FIG. 10) in response to unsuccessful execution of at least one command in the transport command IU.

At block 1206, the channel subsystem 108 interrupts the CPU 104 in the I/O processing system 100 to provide notice of an I/O exception condition. The channel subsystem 108 can extract exception condition feedback from status section 1002 and extended status section 1004 of the response message 1000 of FIG. 10, where the response message 1000 depicts one embodiment of the transport response IU message. Various status flags, termination reason codes, and RCQ words are read from the transport response IU message to determine why an exception condition occurred.

At block 1208, the channel subsystem 108 reports status associated with the exception condition feedback to the CPU 104 in an interrupt response block, e.g., IRB 1100 of FIG. 11. Sub-channel status 1138 and sub-channel extended status 1142 of FIG. 11 may describe a check condition and detail associated with the check condition as previously described.

Technical effects of exemplary embodiments include handling of exception condition feedback at a channel subsystem from a control unit in an I/O processing system. The channel subsystem can receive notice of exception conditions, including termination reason codes and RCQ words, in a response message from a control unit. The channel subsystem can trigger an interrupt to a CPU in the I/O processing system, and provide both status and extended status information related to the exception conditions. Advantages include enabling control units to execute multiple commands unless/until an exception condition is encountered. Further advantages include providing enhanced reporting of exception conditions to a CPU via a channel subsystem interrupt, where a control unit identifies the exception conditions.

Figure 13:
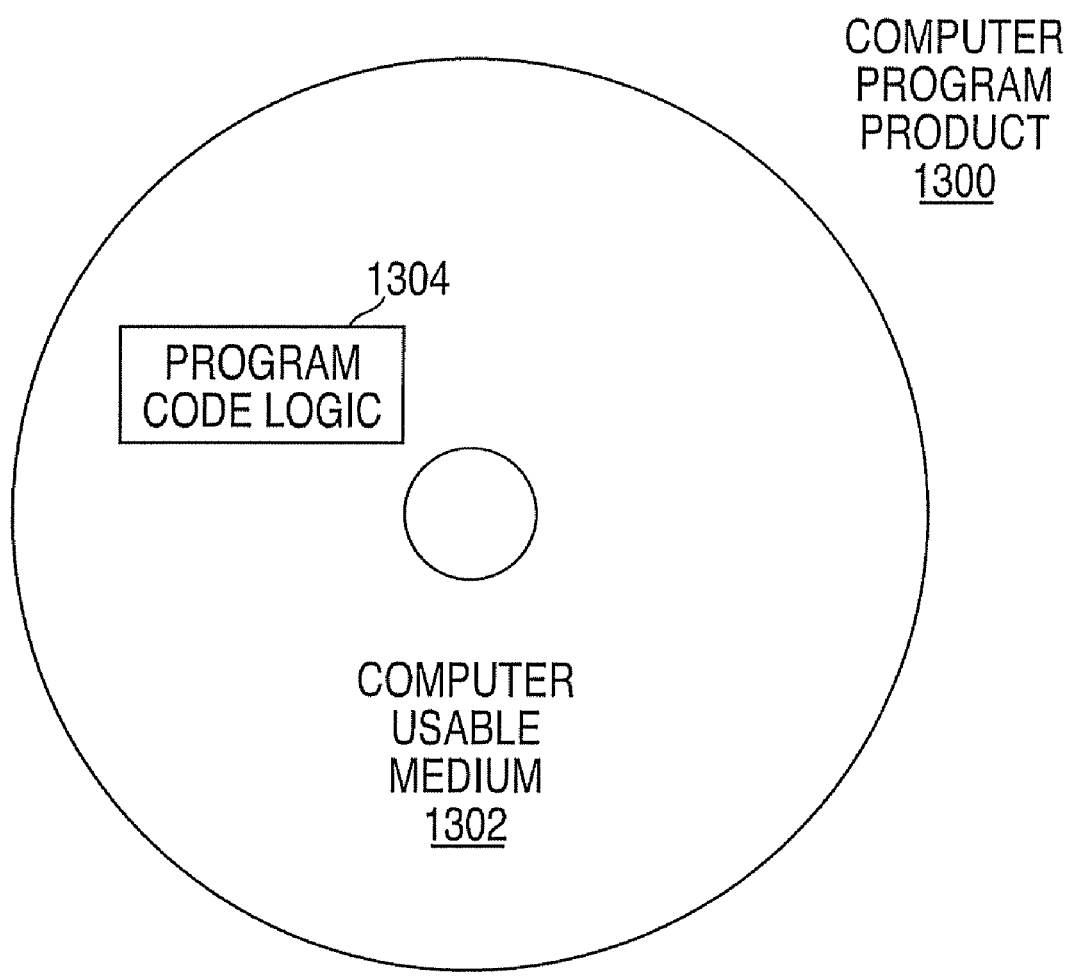
FIG. 13 depicts one embodiment of a computer program product incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 1300 as depicted in FIG. 13 on a computer usable medium 1302 with computer program code logic 1304 containing instructions embodied in tangible media as an article of manufacture. Exemplary articles of manufacture for computer usable medium 1302 may include floppy diskettes, CD-ROMs, hard drives, universal serial bus (USB) flash drives, or any other computer-readable storage medium, wherein, when the computer program code logic 1304 is loaded into and executed by a computer, the computer becomes an apparatus for practicing the invention. Embodiments include computer program code logic 1304, for example, whether stored in a storage medium, loaded into and/or executed by a computer, or transmitted over some transmission medium, such as over electrical wiring or cabling, through fiber optics, or via electromagnetic radiation, wherein, when the computer program code logic 1304 is loaded into and executed by a computer, the computer becomes an apparatus for practicing the invention. When implemented on a general-purpose microprocessor, the computer program code logic 1304 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for handling exception condition feedback at a channel subsystem of an input/output (I/O) processing system using data from a control unit, the channel subsystem configured to send command messages of a corresponding Transport control Word (TCW) channel program and performing I/O operations, the computer program product comprising:
   a tangible storage medium readable by a processing circuit and storing instructions for execution by the processing circuit for performing a method comprising:
      sending a command message to the control unit for an I/O operation to be performed;
      responsive to the sent command message specifying a write operation, sending data for the write operation to the control unit;
      receiving a response message in response to the command message, the response message comprising device requested program check information resulting from a TCW channel program error detected by the control unit and a termination reason code, the device requested program check information comprising a device requested program check indication, the device requested program check information for identifying control unit detected channel program errors related to the sent command message or the sent data of the write operation;
      interrupting a central processing unit (CPU) in the I/O processing system; and
      reporting status associated with the device requested program check information of the received response message to the CPU in an interrupt response block comprising a status flag field having a device requested program check code for indicating whether the device requested program check indication was received.

2. The computer program product of claim 1 wherein the termination reason code identifies one or more of: invalidity of the command message, an invalid cyclic redundancy check (CRC), incorrect length of the command message, a transport command area header error, a device control word (DCW) specification error, a transfer direction specification error, a transport count specification error, and two active (I/O) operations to a common device address.

3. The computer program product of claim 1 wherein the response message includes a reason code qualifier (RCQ) providing encoded meaning corresponding to the termination reason code.

4. The computer program product of claim 3 wherein the RCQ includes information on one or more of: a length mismatch of the sent command message, a longitudinal redundancy check (LRC) error, and a field specification error in the sent command message.

5. The computer program product of claim 4 wherein the field specification error is one of: a format field specification error, a reserved field specification error, a service action code field specification error, a flags field command chaining specification error, a control data count field specification error, a direction specification error, and a count specification error.

6. The computer program product of claim 1 wherein the response message includes a status field and an extended status field, the extended status field including the termination reason code.

7. The computer program product of claim 6 wherein the method further comprises:
   copying information from a status flags field in the response message to the interrupt response block, wherein the status flags field indicates that the extended status field is included as part of the response message.

8. The computer program product of claim 6 wherein the status field includes one or more flags capable of declaring one of: a device level exception, a link reject, a resetting event, a device requested program check, and a device requested program check with a possible interface control check.

9. The computer program product of claim 1 wherein the interrupt response block includes a sub-channel status and a sub-channel extended status, the sub-channel status identifying a check condition and the sub-channel extended status providing detail associated with the check condition.

10. The computer program product of claim 9 wherein the sub-channel extended status indicates at least one of: a storage request limit exceeded, a count mismatch, an unsupported mode, an invalid transport control word, a device requested program check, a device requested program check with a possible interface control check, a storage exception, and an interface control check cause.

11. An apparatus for handling exception condition feedback in an input/output ((I/O)) processing system, the apparatus comprising:
   a channel subsystem in communication with a control unit, the channel subsystem configured to send command messages of a corresponding Transport control word (TCW) channel program and performing (I/O) operations, the channel subsystem configured to perform a method comprising:
      sending a command message to the control unit for an (I/O) operation to be performed;
      responsive to the sent command message specifying a write operation, sending data for the write operation to the control unit;
      receiving a response message in response to the command message, the response message comprising device requested program check information resulting from a TCW channel program error detected by the control unit and a termination reason code, the device requested program check information comprising a device requested program check indication, the device requested program check information for identifying control unit detected channel program errors related to the sent command message or the sent data of the write operation;

interrupting a central processing unit (CPU) in the I/O processing system; and reporting status associated with the device requested program check information of the received response message to the CPU in an interrupt response block comprising a status flag field having a device requested program check code for indicating whether the device requested program check indication was received.

12. The apparatus of claim 11 wherein the termination reason code identifies one or more of: invalidity of the command message, an invalid cyclic redundancy check (CRC), incorrect length of the command message, a transport command area header error, a device control word (DCW) specification error, a transfer direction specification error, a transport count specification error, and two active (I/O) operations to a common device address.

13. The apparatus of claim 11 wherein the response message includes a reason code qualifier (RCQ) providing encoded meaning corresponding to the termination reason code.

14. The apparatus of claim 13 wherein the RCQ includes information on one or more of: a length mismatch of the sent command message, a longitudinal redundancy check (LRC) error, and a field specification error in the sent command message.

15. The apparatus of claim 14 wherein the field specification error is one of: a format field specification error, a reserved field specification error, a service action code field specification error, a flags field command chaining specification error, a control data count field specification error, a direction specification error, and a count specification error.

16. The apparatus of claim 11 wherein the response message includes a status field and an extended status field, the extended status field including the termination reason code.

17. The apparatus of claim 16 wherein the channel subsystem performing the method further comprises:
copying information from a status flags field in the response message to the interrupt response block, wherein the status flags field indicates that the extended status field is included as part of the response message.

18. The apparatus of claim 16 wherein the status field includes one or more flags capable of declaring one of: a device level exception, a link reject, a resetting event, a device requested program check, and a device requested program check with a possible interface control check.

19. The apparatus of claim 11 wherein the interrupt response block includes a sub-channel status and a sub-channel extended status, the sub-channel status identifying a check condition and the sub-channel extended status providing detail associated with the check condition.

20. The apparatus of claim 19 wherein the sub-channel extended status indicates at least one of: a storage request limit exceeded, a count mismatch, an unsupported mode, an invalid transport control word, a device requested program check, a device requested program check with a possible interface control check, a storage exception, and an interface control check cause.

21. A method for handling exception condition feedback at a channel subsystem of an input/output (I/O) processing system using data from a control unit, the channel subsystem configured to send command messages of a corresponding Transport control word (TCW) channel program and performing I/O operations, the method comprising:

sending a command message to the control unit for an I/O operation to be performed;

responsive to the sent command message specifying a write operation, sending data for the write operation to the control unit;

receiving a response message in response to the command message, the response message comprising device requested program check information resulting from a TCW channel program error detected by the control unit and a termination reason code, the device requested program check information comprising a device requested program check indication, the device requested program check information for identifying control unit detected channel program errors related to the sent command message or the sent data of the write operation;

interrupting a central processing unit (CPU) in the (I/O) processing system; and reporting status associated with the device requested program check information of the received response message to the CPU in an interrupt response block comprising a status flag field having a device requested program check code for indicating whether the device requested program check indication was received.

22. The method of claim 21 wherein the termination reason code identifies one or more of invalidity of the command message, an invalid cyclic redundancy check (CRC), incorrect length of the command message, a transport command area header error, a device control word (DCW) specification error, a transfer direction specification error, a transport count specification error, and two active (I/O) operations to a common device address, and further wherein the response message further includes a reason code qualifier (RCQ) including information on one or more of: a length mismatch of the command message, a longitudinal redundancy check (LRC) error, and a field specification error in the command message.

23. The method of claim 21 wherein the response message includes a status field and an extended status field, the extended status field including the termination reason code, and further wherein the status field includes one or more flags capable of declaring one of: a device level exception, a link reject, a resetting event, a device requested program check, and a device requested program check with a possible interface control check.

24. The method of claim 23 further comprising:
copying information from a status flags field in the response message to the interrupt response block, wherein the status flags field indicates that the extended status field is included as part of the response message.

25. The method of claim 21 wherein the interrupt response block includes a sub-channel status and a sub-channel extended status, the sub-channel status identifying a check condition and the sub-channel extended status providing detail associated with the check condition indicating at least one of: a storage request limit exceeded, a count mismatch, an unsupported mode, an invalid transport control word, a device requested program check, a device requested program check with a possible interface control check, a storage exception, and an interface control check cause.

26. The computer program product of claim 1, wherein the response message comprises a status field and an extended status field, the status field comprising a status flag field for indicating the device requested program check indication, the extended status field comprising a termination reason codes field and a reason code qualifier words field, the termination reason codes field for providing termination reason codes, the reason code qualifier words field for providing detail information of corresponding termination reason codes, wherein the status flag field of the interrupt response block comprises a subchannel extended status field for reporting device requested program check codes.

27. The computer program product of claim 26, wherein the termination reason codes consist of a first code for a transport command information unit (IU) transport failure, a second code for an incorrect transport command IU length specification, a third code for a transport command area header (TCAH) specification error, a fourth code for a device control word (DCW) specification error related to a DCW offset, a fifth code for a transfer-direction specification error wherein a DCW command specifies a direction of data transfer that is different than a transfer direction specified by a transport command header (TCH), a sixth code for a transport-count specification error and a seventh code for indicating two (I/O) operations are active to the same device address.

28. The apparatus of claim 11, wherein the response message comprises a status field and an extended status field, the status field comprising a status flag field for indicating the device requested program check indication, the extended status field comprising a termination reason codes field and a reason code qualifier words field, the termination reason codes field for providing termination reason codes, the reason code qualifier words field for providing detail information of corresponding termination reason codes, wherein the status flag field of the interrupt response block comprises a subchannel extended status field for reporting device requested program check codes.

29. The apparatus of claim 28, wherein the termination reason codes consist of a first code for a transport command information unit (IU) transport failure, a second code for an incorrect transport command IU length specification, a third code for a transport command area header (TCAH) specification error, a fourth code for a device control word (DCW) specification error related to a DCW offset, a fifth code for a transfer-direction specification error wherein a DCW command specifies a direction of data transfer that is different than a transfer direction specified by a transport command header (TCH), a sixth code for a transport-count specification error and a seventh code for indicating two I/O operations are active to the same device address.

30. The method of claim 21, wherein the response message comprises a status field and an extended status field, the status field comprising a status flag field for indicating the device requested program check indication, the extended status field comprising a termination reason codes field and a reason code qualifier words field, the termination reason codes field for providing termination reason codes, the reason code qualifier words field for providing detail information of corresponding termination reason codes, wherein the status flag field of the interrupt response block comprises a subchannel extended status field for reporting device requested program check codes.

31. The method of claim 30, wherein the termination reason codes consist of a first code for a transport command information unit (IU) transport failure, a second code for an incorrect transport command IU length specification, a third code for a transport command area header (TCAH) specification error, a fourth code for a device control word (DCW) specification error related to a DCW offset, a fifth code for a transfer-direction specification error wherein a DCW command specifies a direction of data transfer that is different than a transfer direction specified by a transport command header (TCH), a sixth code for a transport-count specification error and a seventh code for indicating two I/O operations are active to the same device address.

* * * * *